United States Patent [19]
Arimoto et al.

[11] Patent Number: 5,760,343
[45] Date of Patent: Jun. 2, 1998

[54] COMBINATIONAL WEIGHING SYSTEMS AND METHODS FOR AUTOMATICALLY ALIGNING WEIGHED ARTICLE BATCHES

[75] Inventors: Yoshihiro Arimoto; Kenzo Tsuzuike; Michihiko Yonetsu; Yoshiharu Asai, all of Shiga, Japan

[73] Assignee: Ishida Co., Ltd., Kyoto, Japan

[21] Appl. No.: 880,241

[22] Filed: Jun. 23, 1997

Related U.S. Application Data

[63] Continuation of Ser. No. 299,680, Sep. 1, 1994, abandoned.

[30] Foreign Application Priority Data

Sep. 3, 1993 [JP] Japan .................. 5-243747
Sep. 28, 1993 [JP] Japan .................. 5-265640
Nov. 19, 1993 [JP] Japan .................. 5-314259

[51] Int. Cl.[6] ........................................ G01G 13/00
[52] U.S. Cl. .................. 177/25.18; 177/145; 198/448; 198/451; 198/452
[58] Field of Search ............................ 177/17, 25.18, 177/60, 63, 105, 114, 145; 198/448, 451, 452, 460.1, 460.2, 461.1, 461.2, 461.3, 453

[56] References Cited

U.S. PATENT DOCUMENTS

| | | | |
|---|---|---|---|
| 3,580,141 | 5/1971 | Richter | 198/448 X |
| 3,739,901 | 6/1973 | Crispe | 198/448 X |
| 4,054,199 | 10/1977 | Polderman | 198/452 |
| 4,106,628 | 8/1978 | Warkentin et al. | 177/25.18 X |
| 4,206,822 | 6/1980 | Mazzucchelli | 177/25.18 X |
| 4,356,908 | 11/1982 | Embro, Jr. | 198/461 |
| 4,398,612 | 8/1983 | Mikami et al. | 177/25.18 |
| 4,442,910 | 4/1984 | Mikami | 177/25.18 |
| 4,489,820 | 12/1984 | Schneider | 198/448 |
| 4,514,959 | 5/1985 | Shroyer | 53/428 |
| 4,564,103 | 1/1986 | Sashiki et al. | 198/358 |
| 4,629,017 | 12/1986 | Shroyer | 177/25.18 |
| 4,666,002 | 5/1987 | Haze | 177/1 |
| 4,678,047 | 7/1987 | Kataoka et al. | 177/25.18 |
| 4,858,708 | 8/1989 | Kohno | 177/25.18 |
| 5,094,337 | 3/1992 | van Veldhuisen et al. | 198/357 |
| 5,147,023 | 9/1992 | Meindl | 198/454 |
| 5,178,225 | 1/1993 | Anderson et al. | 177/52 |
| 5,270,495 | 12/1993 | Mosher et al. | 177/25.18 |

FOREIGN PATENT DOCUMENTS

| | | |
|---|---|---|
| A0061321 | 3/1986 | European Pat. Off. |
| A0195428 | 3/1986 | European Pat. Off. |

*Primary Examiner*—Michael L. Gellner
*Assistant Examiner*—Randy W. Gibson
*Attorney, Agent, or Firm*—Keiichi Nishimura

[57] ABSTRACT

A combinational weighing system receives articles sequentially in a plurality of mutually parallel supply lines to be sequentially transported to weighing devices which are individually associated therewith and weigh batches of the articles received therefrom. Combinations of the measured weight values are combined and a particular combination of article batches is selected as having a total weight which satisfies a predefined condition. The article batches in the selected combination are transported in a general direction of flow from the weighing devices to an outlet in mutually different travel modes such that they are automatically aligned one behind another in the direction of flow as they are discharged together through the outlet.

21 Claims, 13 Drawing Sheets

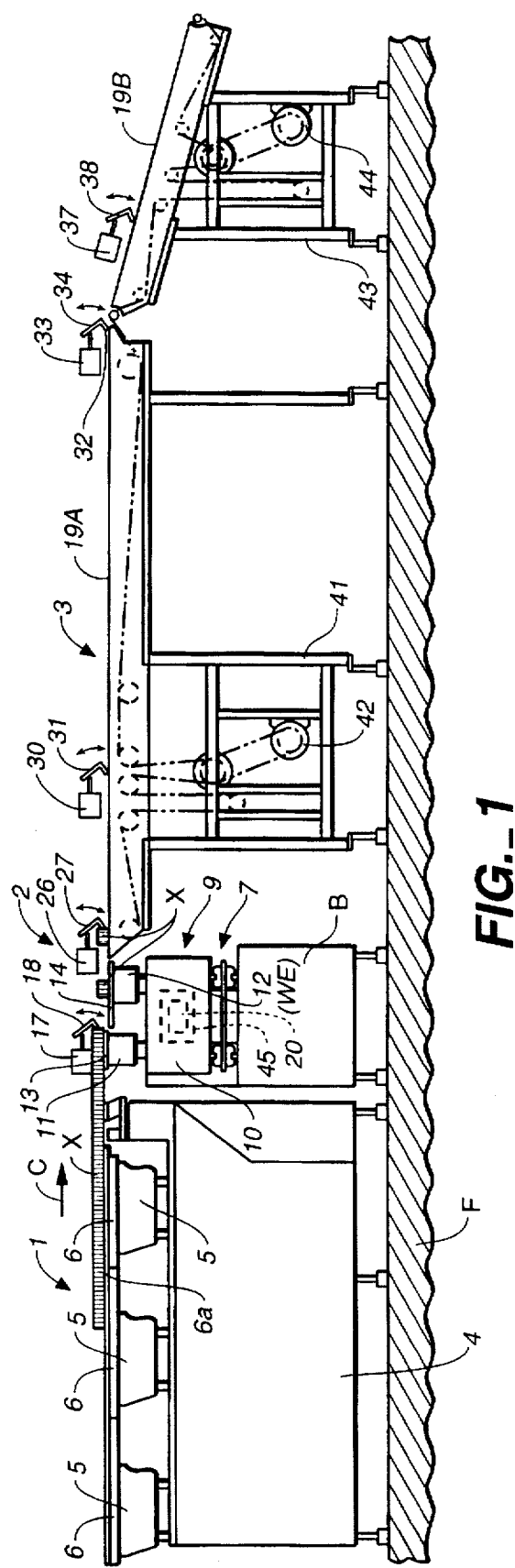
FIG._1

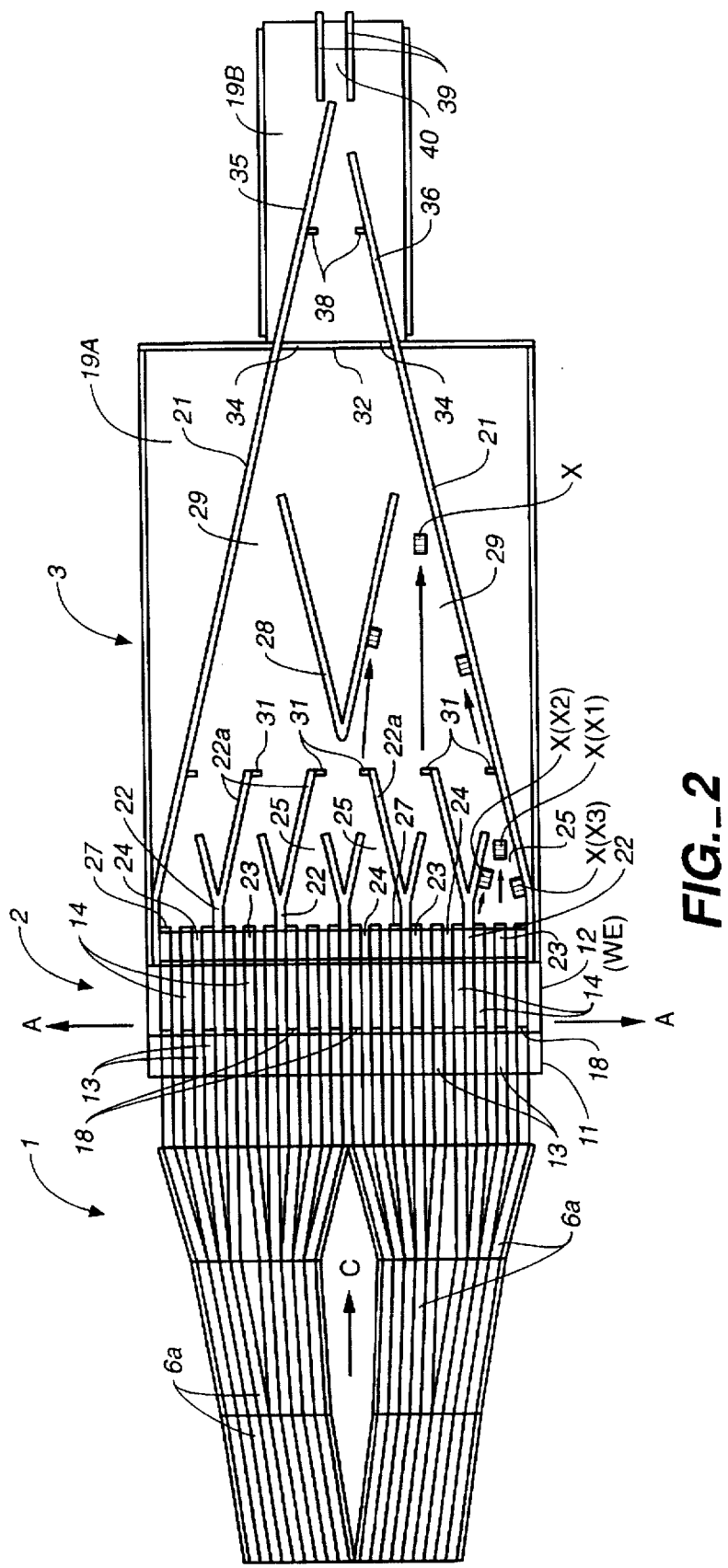
FIG._2

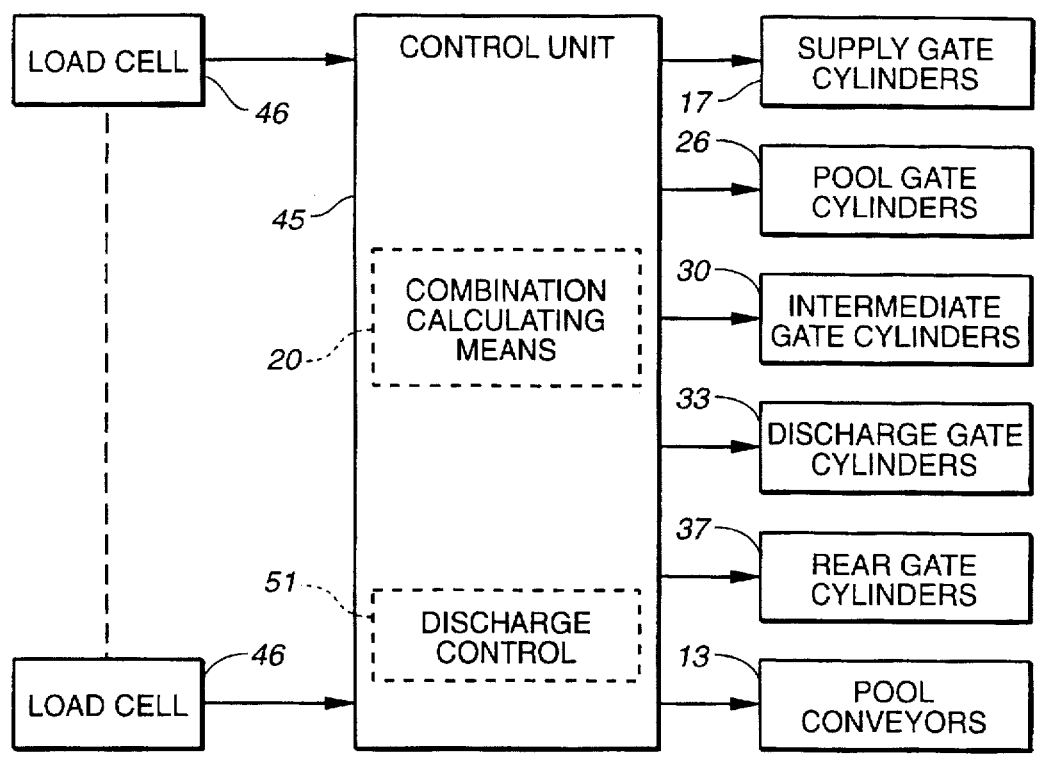
FIG._3
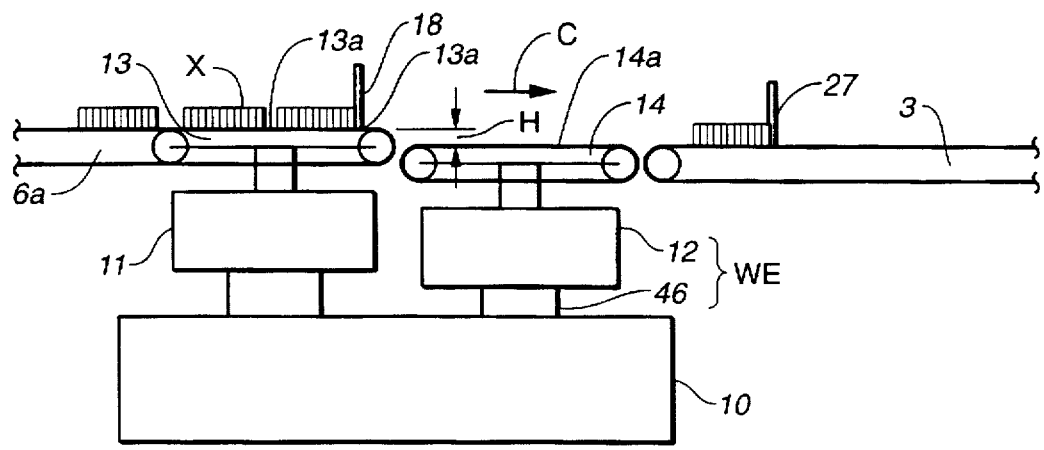
FIG._4

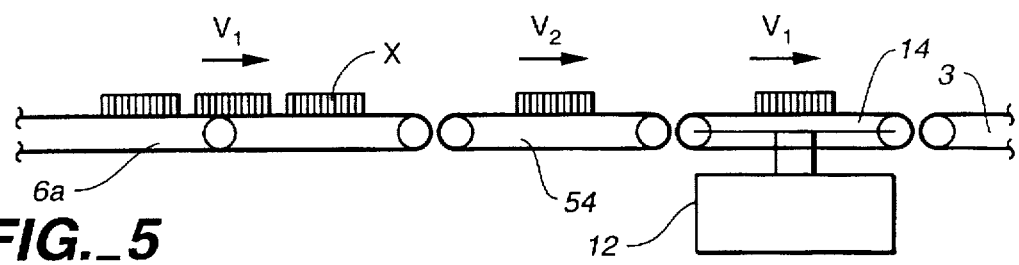
FIG._5
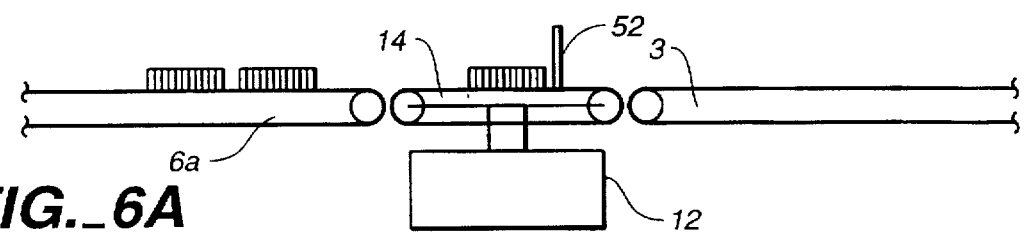
FIG._6A
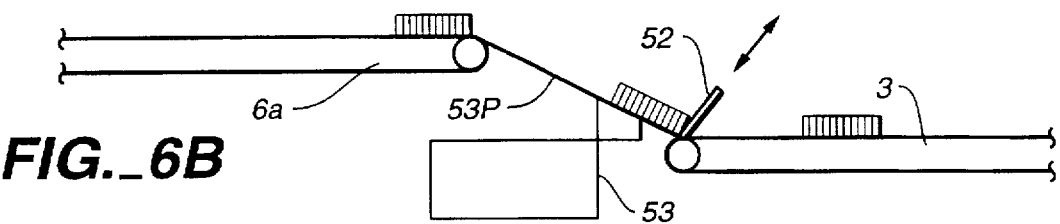
FIG._6B
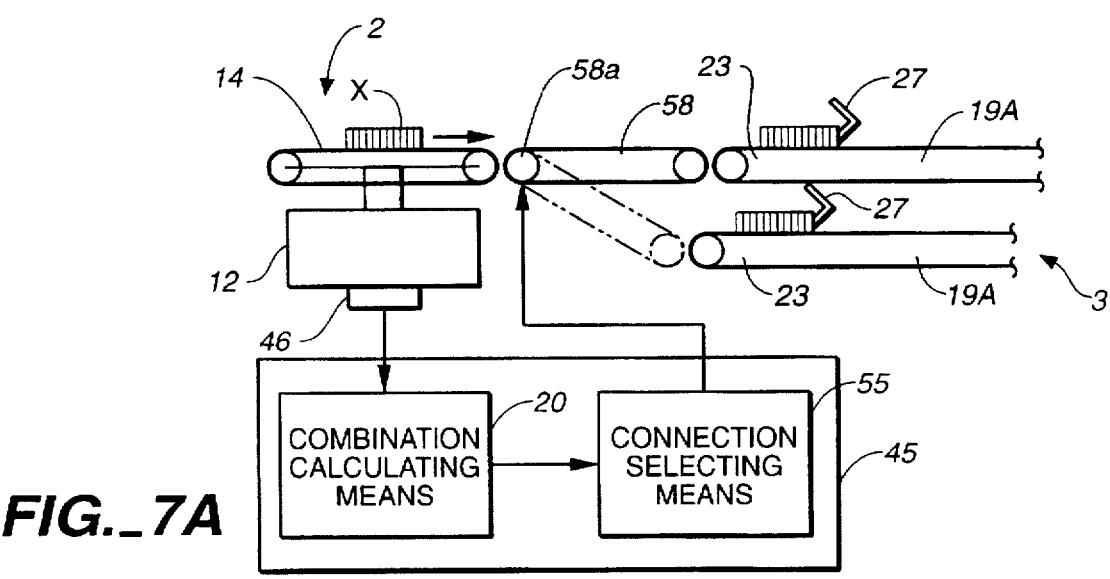
FIG._7A

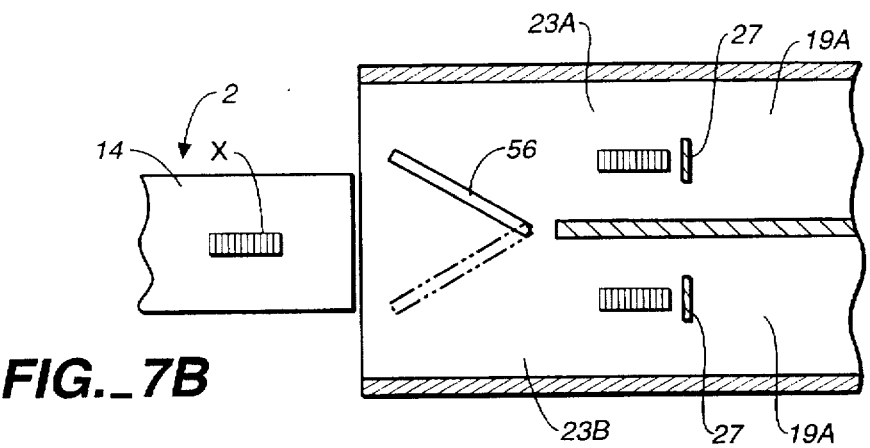
FIG._7B
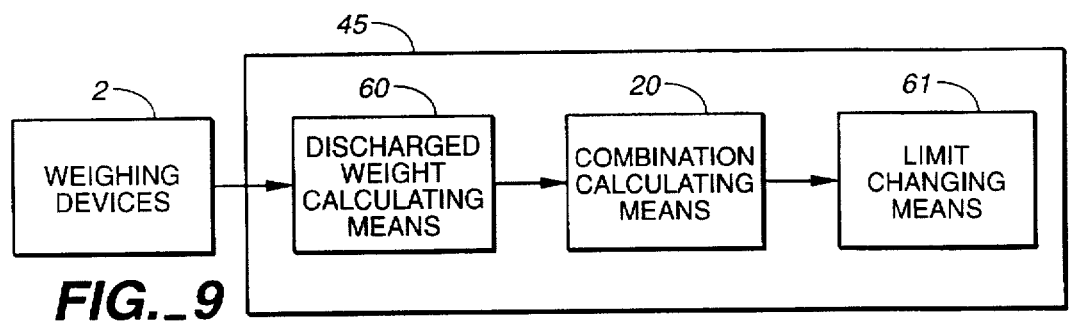
FIG._9
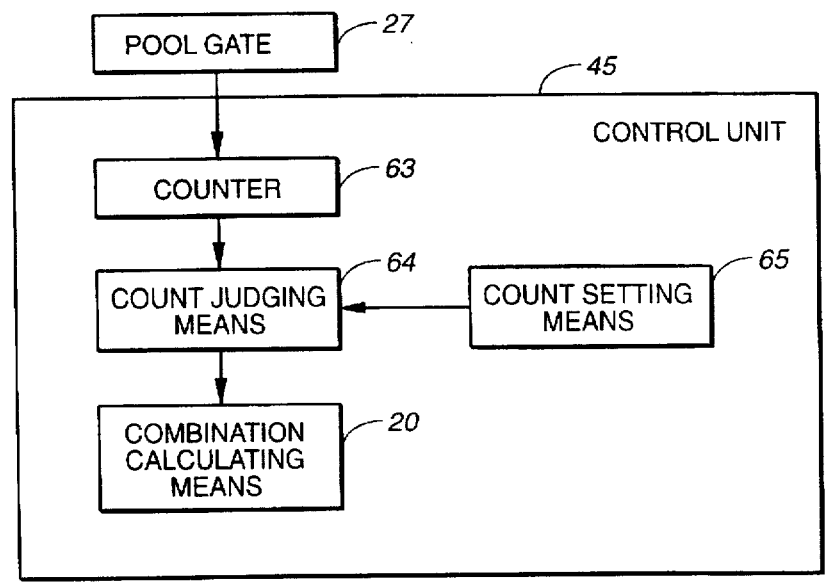
FIG._11

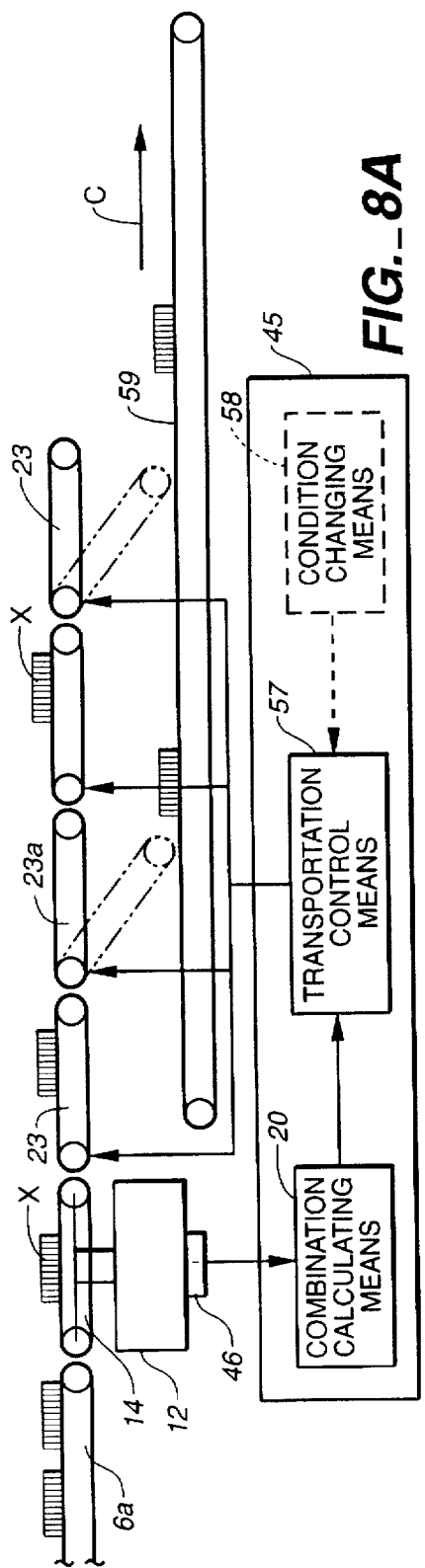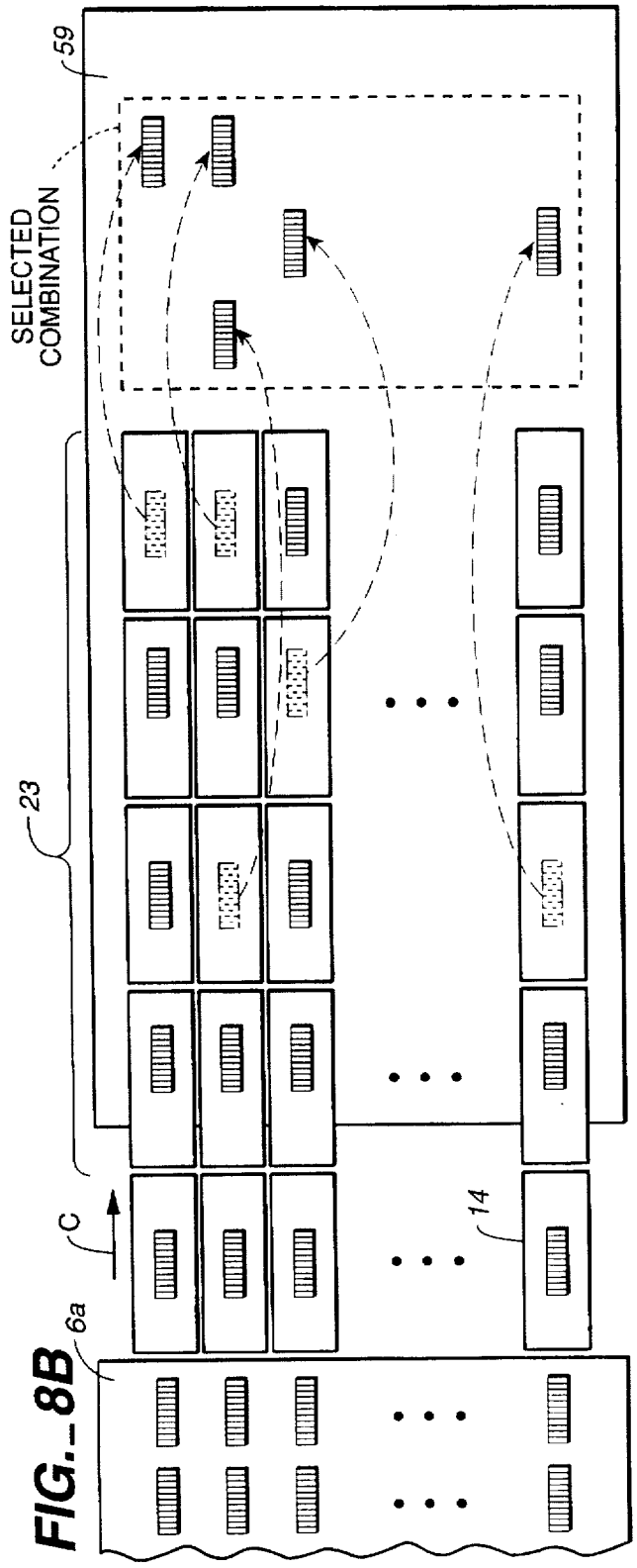

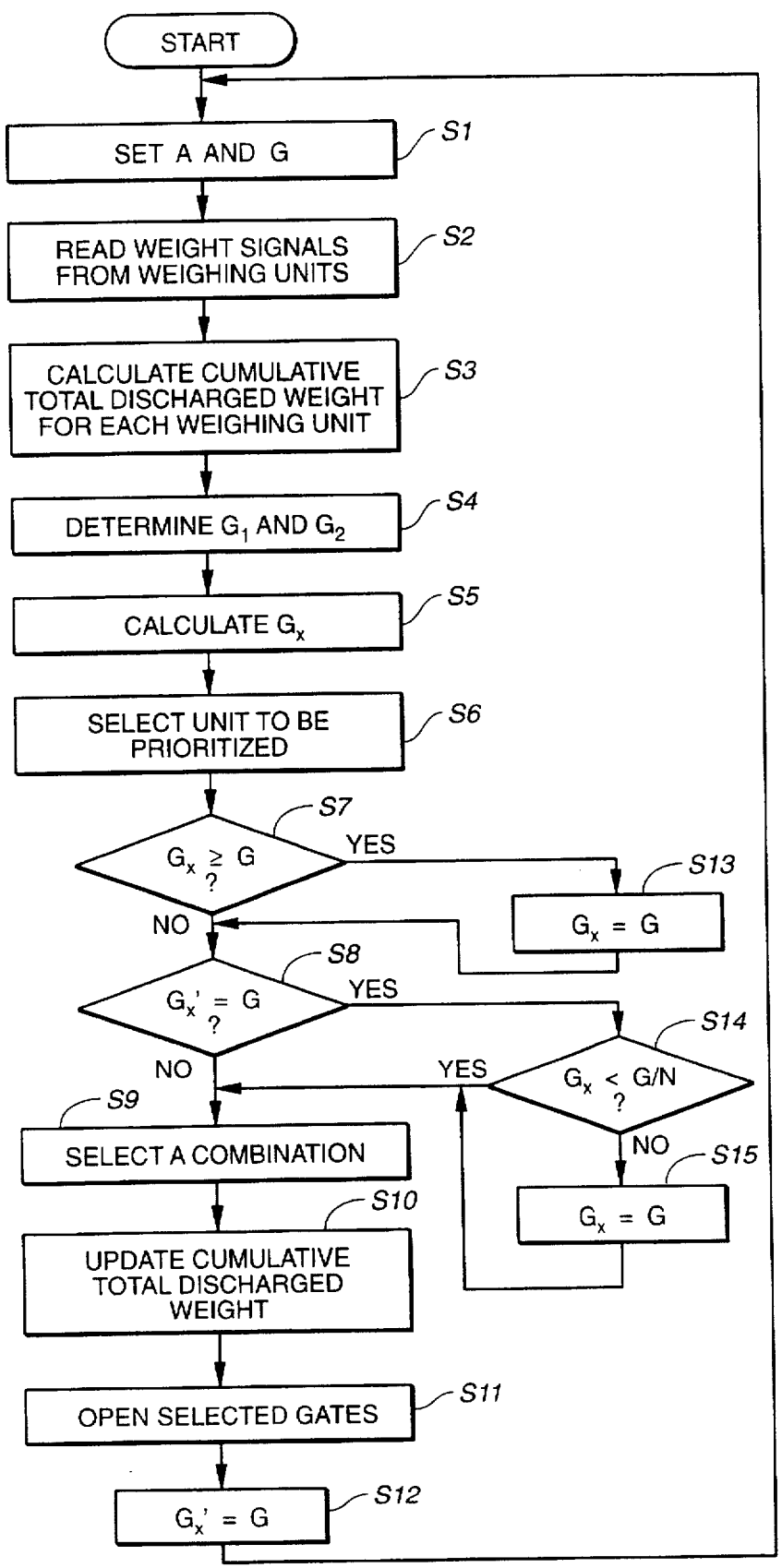
FIG._10

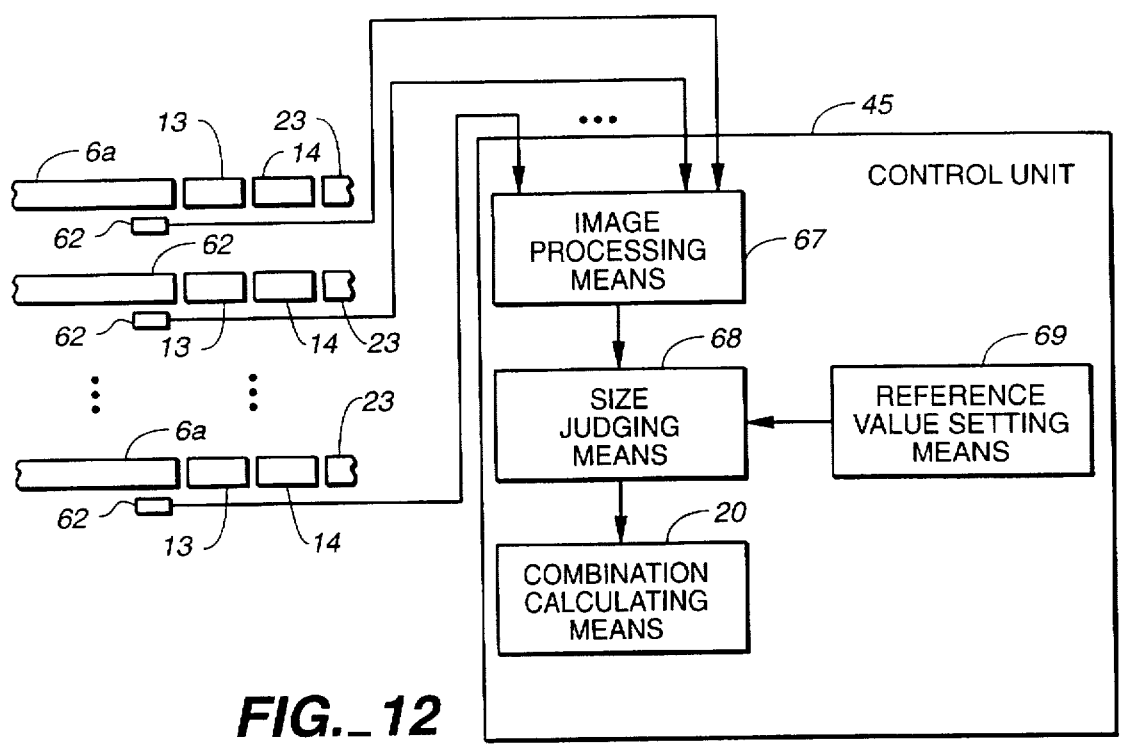
FIG._12
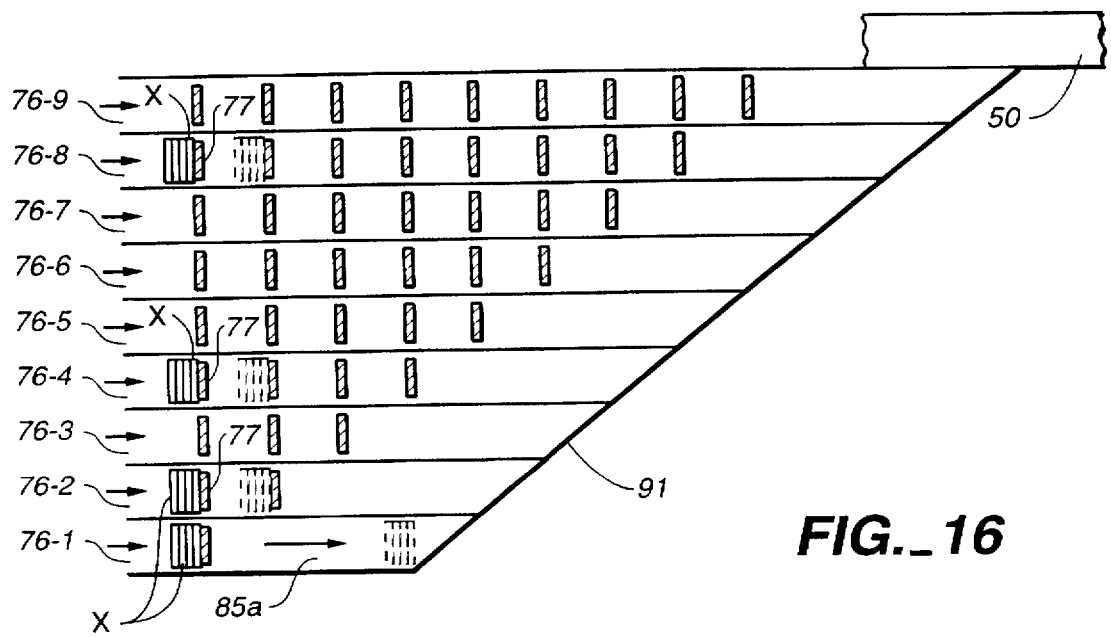
FIG._16

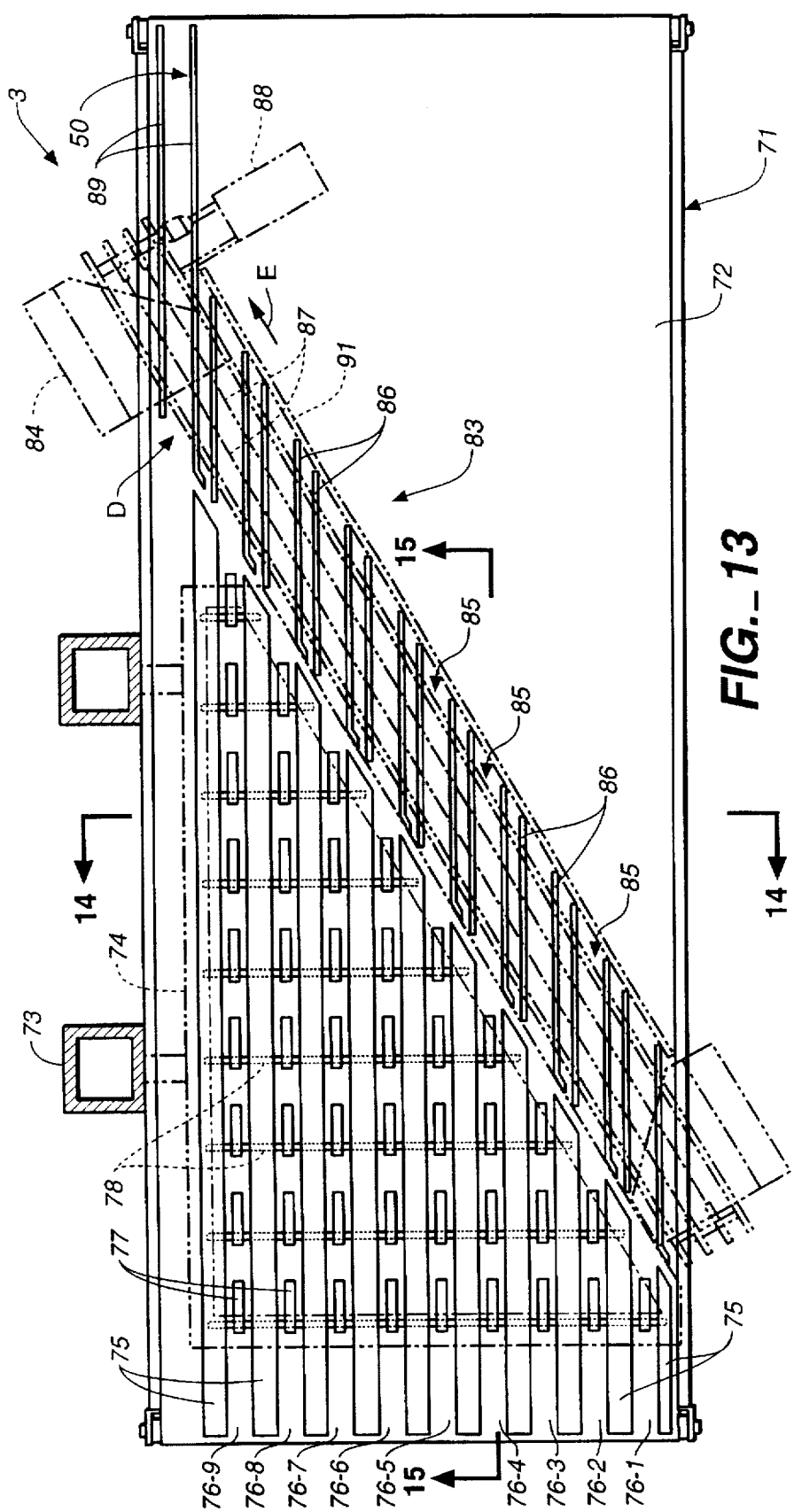
FIG._13

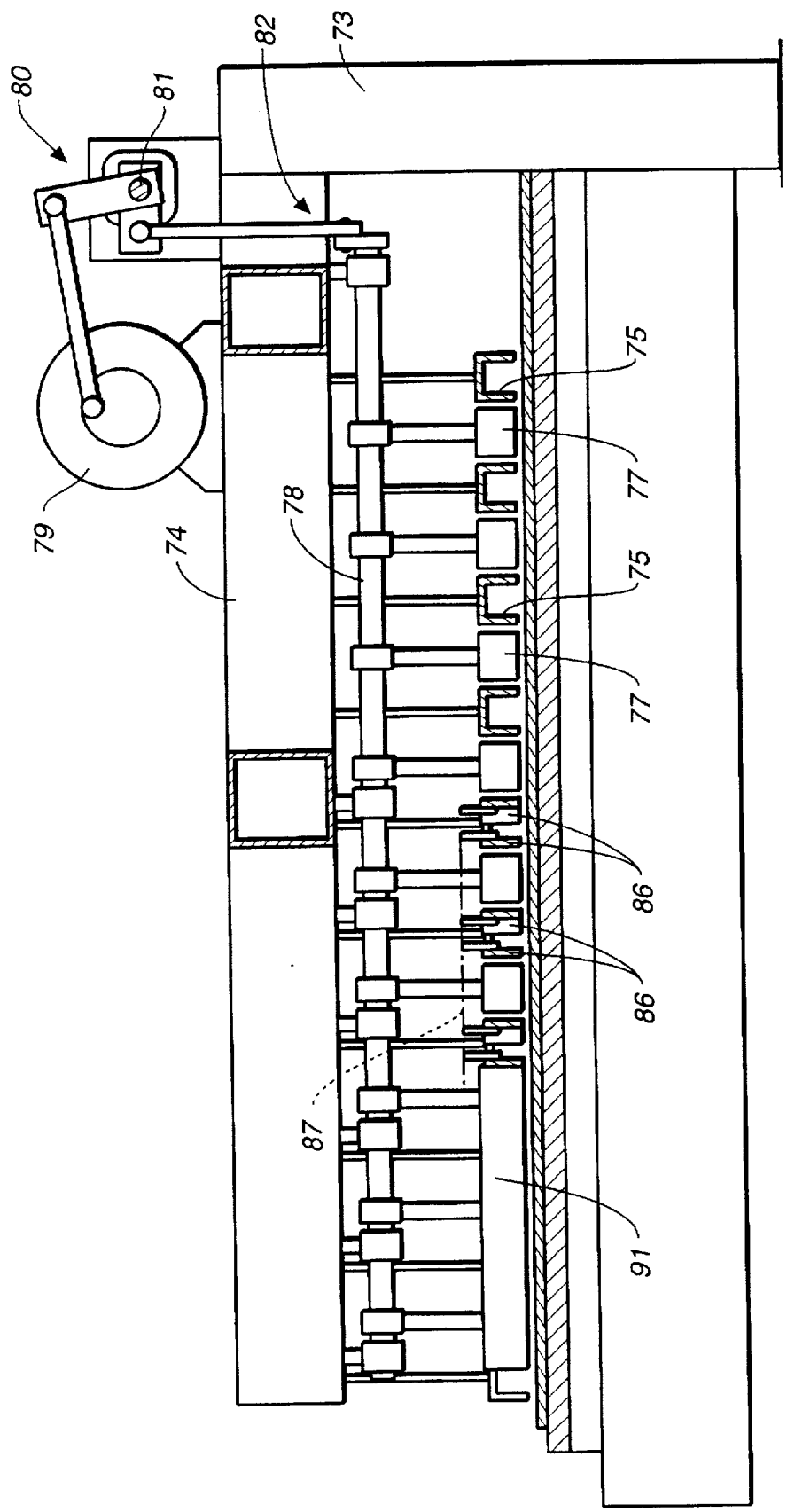
FIG._14

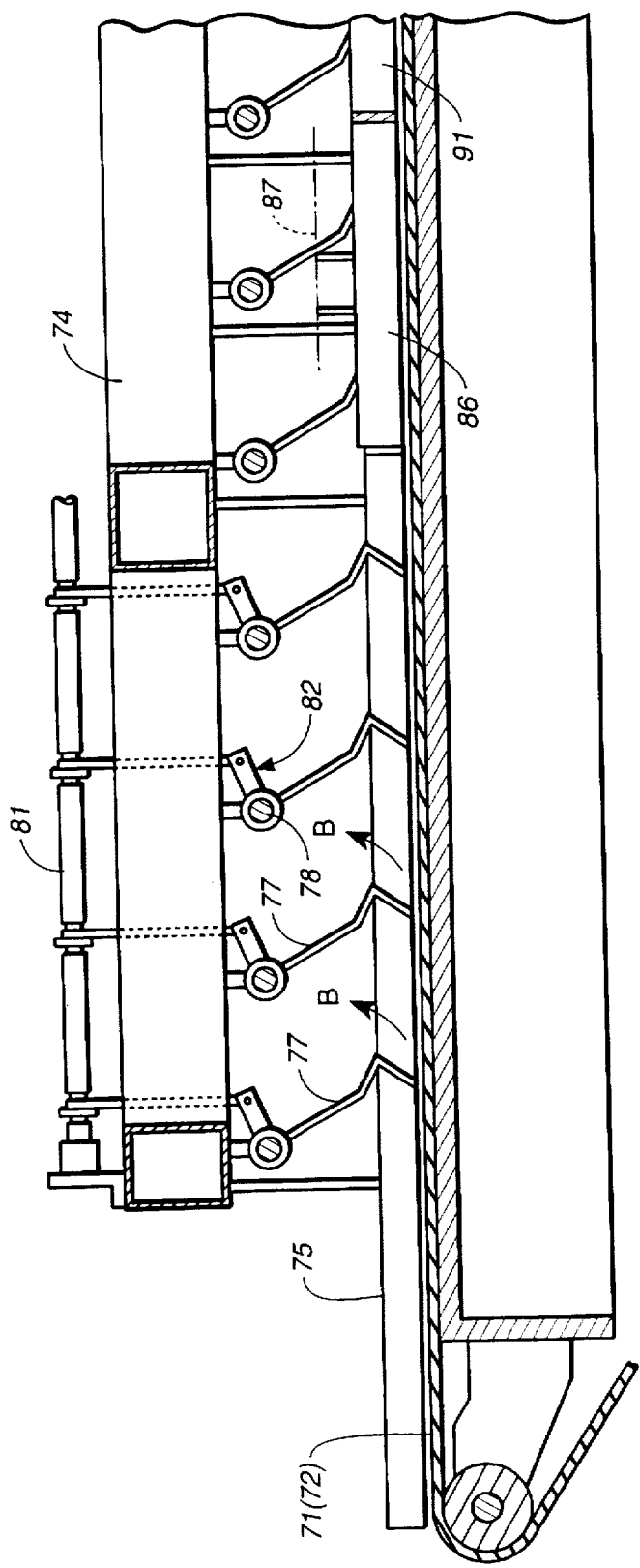
FIG._15

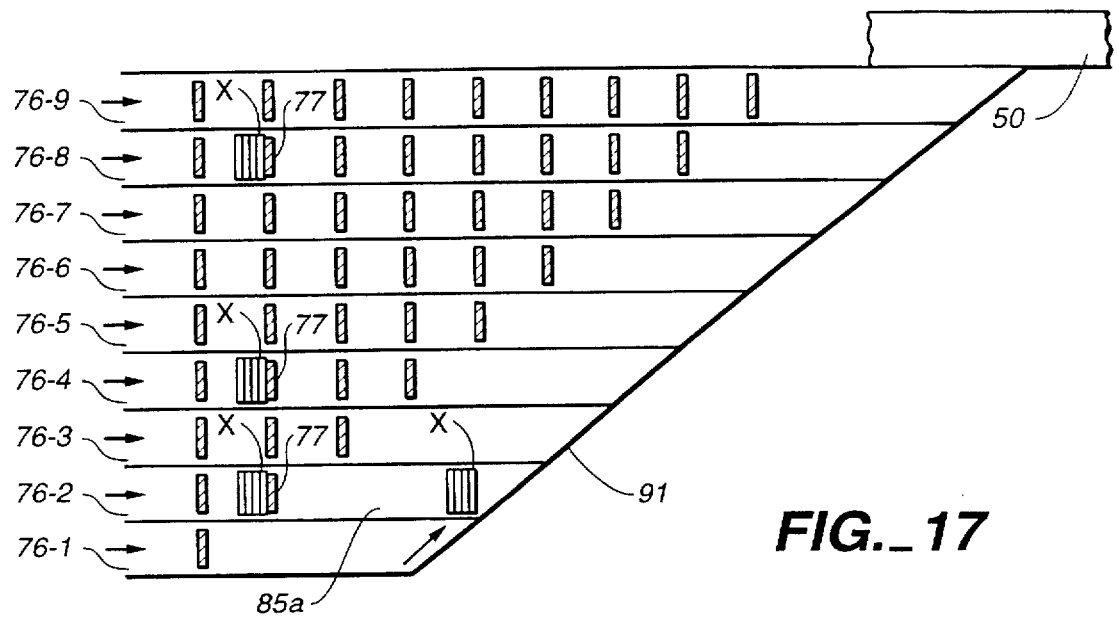
FIG._17
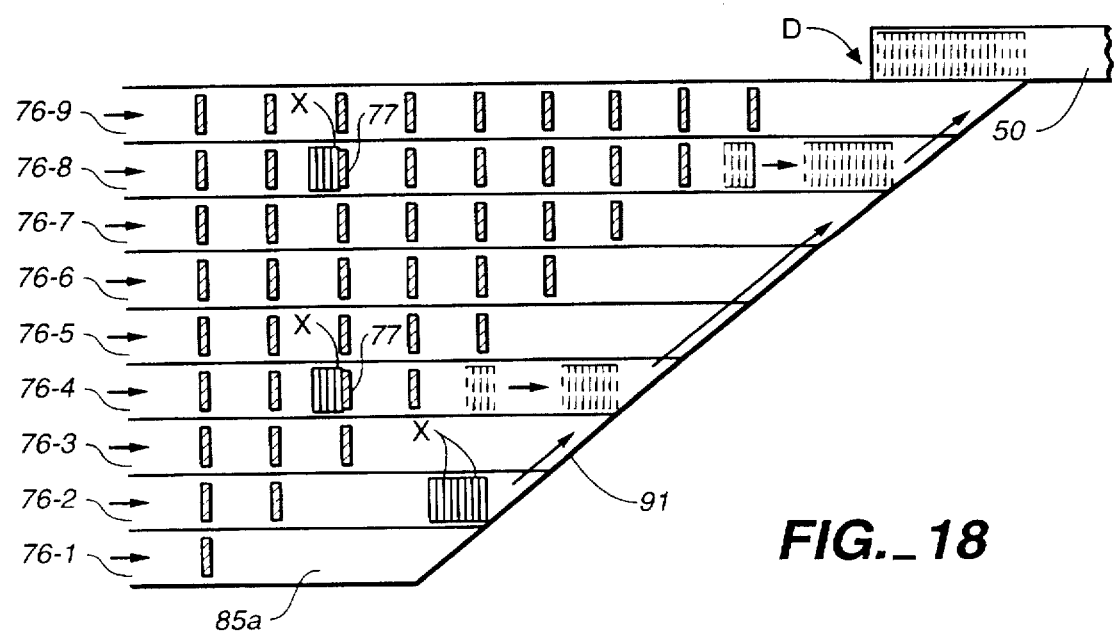
FIG._18

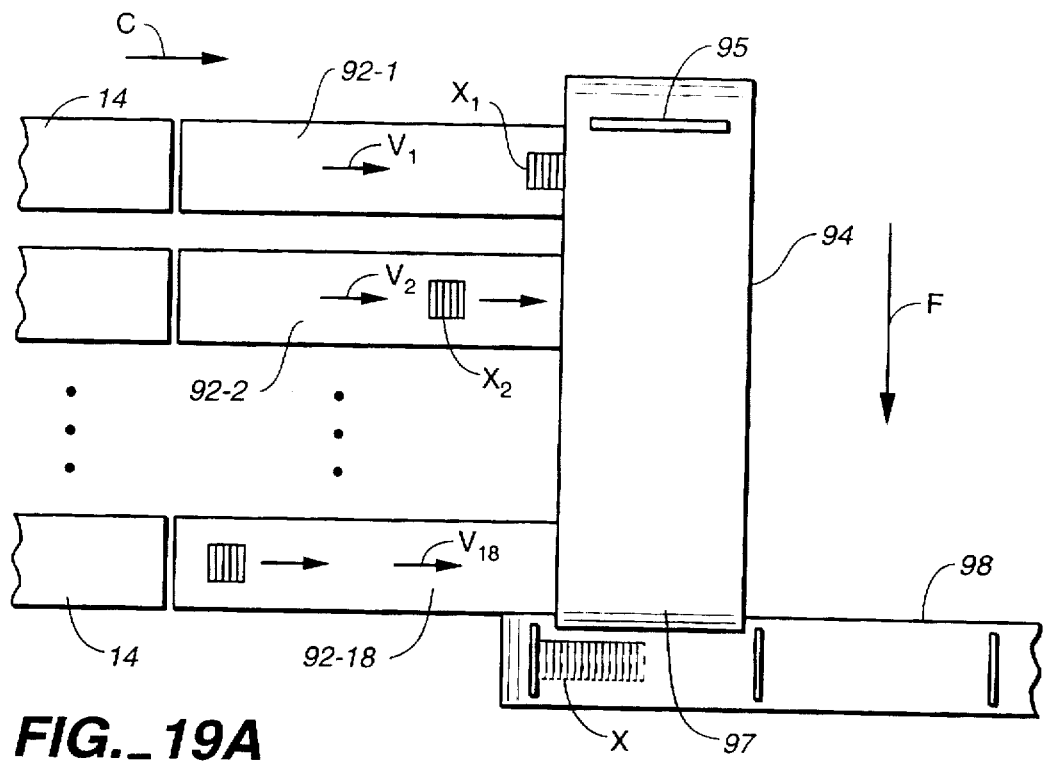
FIG._19A
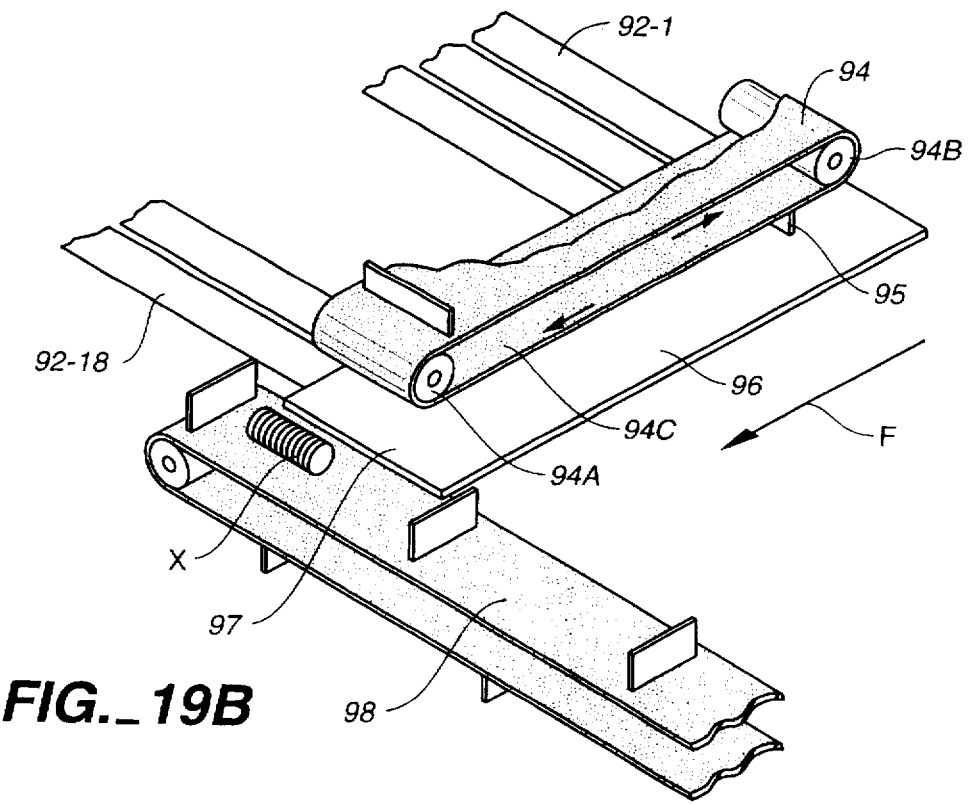
FIG._19B

COMBINATIONAL WEIGHING SYSTEMS AND METHODS FOR AUTOMATICALLY ALIGNING WEIGHED ARTICLE BATCHES

This is a continuation of application Ser. No. 08/299,680, filed Sep. 1, 1994, now abandoned.

BACKGROUND OF THE INVENTION

This invention relates to combinational weighing systems for and methods of carrying out combinational calculations on the weights of batches of fragile articles produced in a specified shape such as potato chips and biscuits while they are being transported in aligned formations, and discharging them together in an aligned formation.

There have been known combinational weighing systems of the type adapted to open a plurality of pool hoppers which receive article batches and drop them into weigh hoppers disposed below, to measure the weight of each article batch by a load cell, to carry out combinational calculations of the weighed values inputted from the individual load cells by using a microcomputer and to compare the results of these calculations with a target weight value in order to select a combination with the total weight value which is close to the target weight value and also within a specified allowable range.

Recently, snack foods such as potato chips produced in the same shape or big-sized biscuits are frequently packaged and sold inside a cylindrical box in a mutually overlapping, neatly aligned arrangement, but combinational weighing systems of the type described above cannot be used in a production line for such products because fragile articles like potato chips and biscuits are easily broken or cracked when they are dropped, for example, from a pool hopper to a weigh hopper. Moreover, combinational weighing systems of the type described above are not adapted to discharge weighed articles in a neatly aligned formation, and hence the articles from the selected combination cannot be easily packaged inside a box.

It is therefore an object of the present invention to provide a combinational weighing system capable of discharging snack foods in the same form such as uniformly shaped potato chips and biscuits in an aligned formation while carrying out combinational weighing such that they can be packaged easily.

SUMMARY OF THE INVENTION

A combinational weighing system according to the present invention, with which the above and other objects can be accomplished, may be characterized as comprising a supply device with a plurality of mutually parallel supply lines for sequentially transporting articles to be weighed, a plurality of weighing devices individually associated with these supply lines and each serving to weigh article batches sequentially and discharging them to a discharge device for transporting them from the weighing devices to a discharge outlet, a combination calculating means for calculating combinations of weight values obtained from the weighing devices and selecting a combination of the article batches according to a predefined criterion such as the combination having the total weight within a pre-defined range and closest to a specified target weight value, and aligning means for causing article batches of the selected combination to be smoothly transported to the outlet in mutually different travel modes without being dropped or changing orientations or arrangements such that they become automatically aligned longitudinally in the downstream direction of their travel as they arrive at the outlet. According to a preferred embodiment of the invention, each weighing device comprises a weighing conveyor adapted to transport and weigh article batches at the same time.

According to another preferred embodiment of the invention, the discharge device comprises pooling devices for allowing weighed article batches received from the weighing devices to be stored temporarily. A discharge control means is provided for causing the combination calculating means to carry out combinational calculations on weight values obtained from article batches on the pooling devices to select a combination of article batches and causing selected article batches from these pooling devices to be discharged. With a system thus structured, new articles are not supplied to the weighing conveyors corresponding to those of the pooling devices not in the selected combination, zero-point adjustments can be carried out on the corresponding weighing devices, and a high accuracy level of combinational calculations can be thereby maintained.

According to still another preferred embodiment of the invention, each pooling device includes a plurality of pooling conveyors and a collecting conveyor disposed below these pooling conveyors. A transportation control means is provided not only for changing the positions of those of the pooling conveyors selected by combinational calculations to thereby cause article batches on the selected pooling conveyors to be transferred onto the collecting conveyor, but also for thereafter causing new article batches to be supplied onto these selected pooling conveyors. If a system is thus structured, the number of article batches which can be included in combinational calculations is effectively increased and the number of possible combinations to be considered also increases, thereby achieving high-speed weighing with high accuracy.

According to still another preferred embodiment of the invention, a combinational weighing system includes a discharged weight calculating means for calculating cumulatively the total weight of article batches discharged from each of the weighing devices and the combination calculating means prioritizes any weighing device which is thereby found to have discharged less articles than the other weighing devices. The combinational calculations are carried out such that the prioritized weighing device is more likely to be selected in the next cycle of calculations. With a system thus structured, the cumulatively totaled weight values of discharged articles become evenly distributed among the weighing devices, and the effective number of available combinations is prevented from diminishing.

BRIEF DESCRIPTION OF THE DRAWINGS

The accompanying drawings, which are incorporated in and form a part of this specification, illustrate an embodiment of the invention and, together with the description, serve to explain the principles of the invention. In the drawings:

FIG. 1 is a schematic side view of a combinational weighing system according to a first embodiment of the invention;

FIG. 2 is a schematic plan view of the system of FIG. 1;

FIG. 3 is a block diagram of the control system of the embodiment shown in FIGS. 1 and 2;

FIG. 4 is a side view showing the manner in which article batches are transported;

FIG. 5 is a side view showing an embodiment with an auxiliary conveyor;

FIGS. 6A and 6B are schematic side views of alternative weighing units with different structures;

FIG. 7A is a schematic side view of a switching conveyor according to another embodiment of the invention having pooling devices in two layers, and FIG. 7B is a schematic plan view of still another embodiment of the invention having two pooling devices next to each other on the same plane;

FIG. 8A is a schematic side view of still another embodiment of the invention with a plurality of pooling conveyors arranged in series, and FIG. 8B is a schematic plan view of the embodiment of FIG. 8A after article batches of a selected combination have been discharged onto the collecting conveyor;

FIG. 9 is a block diagram of a portion of the control unit for another combinational weighing system according to a second embodiment of the invention;

FIG. 10 is a flow chart for showing the operation of the combinational weighing system according to the second embodiment of the invention;

FIG. 11 is a block diagram of a portion of another control unit which may be used instead of the one shown in FIG. 9;

FIG. 12 is a block diagram showing some essential portions of another combinational weighing system according to a third embodiment of the invention;

FIG. 13 is a plan view of a discharge device for still another combinational weighing system according to a fourth embodiment of the invention;

FIG. 14 is a sectional view taken along line 14—14 in FIG. 13;

FIG. 15 is a sectional view taken along line 15—15 in FIG. 13;

FIG. 16 is a plan view of the fourth embodiment shown in FIGS. 13–15 for showing the first stage of its operations;

FIG. 17 is a plan view of the fourth embodiment shown in FIGS. 13–15 for showing the second stage of its operations;

FIG. 18 is a plan view of the fourth embodiment shown in FIGS. 13–15 for showing the third stage of its operations; and FIG. 19A is a plan view of a discharge device for still another combinational weighing system according to a fifth embodiment of the invention, and FIG. 19B is a diagonal perspective view of the same discharge device of FIG. 19A.

In these drawings, components which are identical, or at least equivalent, to each other are indicated by the same numerals.

DETAILED DESCRIPTION OF THE INVENTION

FIGS. 1 and 2 show a combinational weighing system according to a first embodiment of the invention, as being used for carrying out combinational weighing of snack food items which are of the same form such as uniformly shaped potato chips. The system according to this embodiment comprises a supply device 1 for sequentially supplying articles X such as uniformly shaped potato chips, a plurality of weighing devices 2 which may include weighing conveyors for simultaneously transporting and weighing articles X supplied by the supply device 1, a discharge device 3 for discharging article batches X transported from the weighing devices 2 to a discharge outlet. All these devices 1, 2 and 3 are set on a floor F, and the system further includes a control unit 45 containing a combination calculating means 20.

As partly shown in FIG. 1, the supply device 1 includes a supply trough system 6 divided into eight parts set on a base table 4 by means of eight vibrators 5, and each part of the trough system 6 has a plurality (such as eighteen) of supply lines 6a formed thereon, as shown in FIG. 2, in a transverse direction A perpendicular to the general flow direction C of articles and article batches through the system. Many articles X formed in the same specified shape in a production area (not indicated in the figures) are supplied into each of these supply lines 6a in an aligned formation as shown in FIG. 1, and these aligned articles X are moved in the direction of transportation C, while remaining thus aligned, as each part of the supply trough system 6 is vibrated by a vibrator 5.

The weighing devices 2 are associated with a weighing unit 9 set by means of a supporting mechanism 7 on a base B affixed to the floor F. The weighing unit 9 is provided with an electrical unit 10 having electrical components such as combination calculating means 20 contained inside a housing, eighteen first pool conveyor units 11 and eighteen weighing conveyor units 12 (which are parts of a weigher WE). The first pool conveyor units 11 and the weighing conveyor units 12 are set on top of the electrical unit 10 and individually correspond to the same number of supply lines 6a.

The first pool conveyor units 11 are arranged parallel to one another in the transverse direction A such that first pool conveyors 13, which are set thereabove as shown in FIG. 2, can be connected in series correspondingly to the supply lines 6a on the supply trough units 6. Similarly, the weighing conveyor units 12 are arranged parallel to and next to one another in the transverse direction A such that weighing conveyors 14, which are also arranged parallel to and next to one another and set thereabove, can be connected in series correspondingly to the first pool conveyors 13. Each of the first pool conveyors 13 and each of the weighing conveyors 14 are activated by an associated motor (not shown) provided to the corresponding one of the first pool conveyor units 11 or the weighing conveyor units 12 to transport articles X in the direction of transportation shown by the arrow C. As shown in FIG. 4, the first pool conveyors 13 are set on the electrical unit 10 in such a way that their article-transporting surfaces 13a at the top are higher by a specified vertical distance of H than the article-transporting surfaces 14a of the weighing conveyors 14 such that articles X can be smoothly delivered from the first pool conveyors 13 onto the weighing conveyors 14.

A supply gate 18, adapted to be opened and closed by a gate-driver 17 such as an air cylinder, is provided at the forward end (hereinafter with reference to the direction of transportation C) of each first pool conveyor 13, as shown in FIG. 1, for separating out a specified number of the articles X such as uniformly shaped potato chips in an aligned formation to be delivered in batches onto the weighing conveyor 14. In the case of big articles such as large-size biscuits or chocolate plates which are weighed one piece at a time, an auxiliary conveyor 54, adapted to transport article batches at a faster speed $V_2$ than the speed $V_1$ of transportation by the supply lines 6a, may be inserted between each mutually corresponding pair of supply line 6a and weighing conveyor 14 as shown in FIG. 5 so as to create a finite separation distance between an article batch on the supply line 6a and a preceding batch on the auxiliary conveyor 54 as they are received by the weighing conveyor 14.

Each weighing device 2 further comprises a load cell 46 (a part of the weigher WE) of a known kind between the electrical unit 10 and each of the weighing conveyor units 12. Since the weight of each weighing conveyor unit 12 is known, each load cell 46 outputs a weight signal indicative of only the weight of the article batch X which is being transported by the weighing conveyor 14 associated with the corresponding weighing conveyor unit 12.

As shown in FIG. 2, the discharge device 3 comprises a first discharge conveyor 19A and a second discharge conveyor 19B. The first discharge conveyor 19A comprises a wide planar belt for receiving article batches X transported from the eighteen weighing conveyors 14, and the second discharge conveyor 19B is narrower than the first discharge conveyor 19A and is disposed on its downstream side. These discharge conveyors 19A and 19B are activated respectively by motors 42 and 44 set on their respective support bases 41 and 43 as shown in FIG. 1. A pair of guide rails 21 is disposed on the first discharge conveyor 19A approximately in a V-shape, providing an outlet 32 near the tip of the V-shape (or near their downstream ends), as shown in FIG. 2, such that the article batches X received from the weighing conveyors 14 can be gathered together, or to reduce their spread in the transverse direction A.

At the upstream end part of the first discharge conveyor 19A, there are five Y-shaped guide members 22 disposed thereabove and next to one another in the transverse direction A such that six triangularly formed pre-assembly areas 25 are formed between them and the two guide rails 21, each serving to gather article batches X being discharged from three of the weighing conveyors 14 as a group. The four of these five guide members 22, excluding the one at the center, are actually of a deformed Y-shape, with one of the arms longer than the other, as shown in FIG. 2. Partitioning members 24 are provided on the upstream side of each pre-assembly area 25 parallel to the stem portions of the Y-shaped guide members 22 such that pooling devices 23 are formed at the downstream ends of the conveyors 14. These pooling devices 23 serve to transport the articles X from the weighing conveyors 14 to the pre-assembly areas 25 while maintaining their aligned formations. Pool gates 27, adapted to be opened and closed by gate-control means such as air cylinders (schematically indicated at 26 in FIG. 3), are provided at the downstream ends of the weighing devices 2, as shown in FIG. 1.

A V-shaped guide plate 28 is provided above the first discharge conveyor 19A nearly at its center, as shown in FIG. 2 so as to form two nearly triangularly shaped main assembly areas 29 between itself and the two guide rails 21. Each main assembly area 29 is for gathering article batches X from three of the mutually adjacent pre-assembly areas 25, and intermediate gates 31, adapted to be opened and closed by gate-control means such as air cylinders (schematically indicated at 30 in FIG. 3), are provided at positions serving as openings between the pre-assembly areas 25 and corresponding one of the main assembly areas 29. Two discharge gates 34, adapted to be opened and closed by gate-control means such as air cylinders (schematically indicated at 33 in FIG. 3), are additionally provided at both edge parts of the outlet 32.

The second discharge conveyor 19B is similarly provided with a pair of guide plates 35 and 36 arranged thereabove to form a V-shape for arranging article batches X received through the outlet 32 in a line. Rear gates 38, adapted to be opened and closed by gate-control means such as air cylinders (schematically indicated at 37 in FIG. 3), are provided near the center of these guide plates 35 and 36. On the downstream side of the guide plates 35 and 36 is a pair of aligning plates 39 disposed parallel to each other with the separation therebetween adjusted according to the dimension of aligned articles X to be transported therethrough, forming a discharge route 40, say, to a packaging machine (not shown) where the aligned articles X can be packaged easily because they are already neatly aligned.

The various gates 18, 27, 31, 34 and 38, as well as their control means 17, 26, 30 and 37 are supported by a frame (not shown) set on the floor F. The guide rails 21, the guide members 22, the partitioning members 24, the guide plates 28, 35 and 36, and the aligning plate 39 are suspended from the same frame.

The electrical unit 10 of the weighing devices 2 includes a control unit 45 equipped with a microcomputer containing the combination calculating means 20. The control unit 45 serves to receive weight signals indicative of the weight values of article batches X measured by the load cells 46, to carry out combinational calculations (that is, to calculate combinations of these weight values) on the basis of these weight signals, to select a particular combination of these article batches according to a pre-defined criterion, such as the combination having a total weight which is within a specified range and the closest to a pre-specified target value, to open the pool gates 27 corresponding to the article batches in the selected combination by activating the associated air cylinders 26 and to thereby discharge the articles X therefrom into the discharge device 3. The control unit 45 further serves to control the supply and discharge of article batches X by controlling the operations of other control means 17, 30, 33 and 37 as well as each of the first pool conveyors 13.

According to one preferred embodiment of the invention, weight signals from nine of the weighing conveyor units 12 are adapted to be combined to select one combination such that two combinations for discharge can be selected from all of the eighteen weighing conveyor units 12.

Next, the overall operation of the combinational weighing system according to the first embodiment of the invention will be explained. As articles X from a manufacturing device (not shown) are supplied sequentially into the supply lines 6a, they are transported to the weighing conveyors 14 through the corresponding first pool conveyors 13. During this process, the control unit 45 activates the cylinders 17 first to open the supply gates 18 and thereby admit the articles X on the first pool conveyors 13, which have been stopped by these gates 18, onto the weighing conveyors 14. After a specified length of time, the control unit 45 stops the first pool conveyors 13 temporarily and then moves them backward. At the same time, the supply gate cylinders 17 are activated to close the supply gates 18. Since the weighing conveyors 14 are constantly in motion, the articles X placed thereon are transported steadily in the downstream direction while the articles X on the first pool conveyors 13 are moved backward in the opposite (upstream) direction. Specified amounts of the articles X are thus reliably carried onto the weighing conveyors 14 to form article batches.

The article batches X on the weighing conveyors 14 are moved into the various transfer routes on the first discharge conveyor 19A, and the load cells 46 which weighted them output weight signals indicative of the measured weight values to the control unit 45. The control unit 45 carries out combinational calculations as explained above by using these weight signals, thereby selecting a combination according to a pre-defined criterion.

For this operation, the articles X which have been supplied from the first pool conveyors 13 to the corresponding weighing conveyors 14 are thereafter transported in batches to the pooling devices 23 on the downstream side. Since these article batches X are actually first stopped by the pool gates 27, the aforementioned combinational calculations are carried out on the article batches X now being temporarily stored on the pooling devices 23. Since new articles X are yet to be supplied to the weighing conveyors 14 corresponding to those of the pooling devices 23 not selected in the combination, zero-point adjustments are carried out for the corresponding weighing devices in order to maintain a high accuracy level of combinational calculations. In a situation where one of the article batches X is unusually small, since the corresponding weighing conveyor 14 is empty, the corresponding supply gate 18 may be opened to supply an additional amount of the articles to the weighing conveyor 14 before supplying to the corresponding pooling device 23. In this manner, the frequency of occurrence of unsatisfactory weighing situations can be reduced.

The control unit 45 includes a discharge control means 51 serving to open the pool gates 27, which have been preventing the discharge of a selected combination of the article batches X, thereby introducing these article batches X into the corresponding pre-assembly areas 25. In situations where article batches X are introduced into the same pre-assembly area 25 through a plurality of different pool gates 27 leading to this area 25, these pool gates 27 are opened at different times. The lengths of time during which these gates 27 are kept open are determined according to the measured weight values of the corresponding article batches X.

Consider, for example, a situation where selected article batches X are to be discharge through all three pool gates 27 leading to the lowest (hereinafter as FIG. 2 is faced) of the pre-assembly areas 25. In this situation, the middle one of the three pool gates 27 leading to this pre-assembly area 25 is opened first because the article batch X (particularly indicated as X1 in FIG. 2) discharged from this middle pool gate does not experience any frictional force from the guide member 22 or the guide rail 21 and hence can reach the main assembly area most quickly. The gate 27 closer to the guide member 22 opens next because the frictional force from the more gently sloped guide member 22 is weaker on the traveling article batch X (particularly indicated as X2 in FIG. 2) than that from the less gently sloped guide rail 21 on the article batch X (particularly indicated as X3 in FIG. 2) discharged through the lowest of the three pool gate 27. Thus, by opening the three pool gates 27 with specified time delays in between, the article batches X which have been passed therethrough sequentially can be lined up and transported out of the pre-assembly area 25 as an aligned group. This aligned group is thereafter transported along the guide rail 21 until it is temporarily stopped by the corresponding one of the intermediate gates 31 and placed in a wait condition. Article batches X discharged into other pre-assembly areas 25 are similarly brought to corresponding ones of the other intermediate gates 31. Article batches X discharged into any pre-assembly area not at either of the edges are guided by the longer branch 22a of the Y-shape of the neighboring guide member 22. In summary, the guide rails 21 and the Y-shaped guide members 22 are designed such that the speed of article batches X discharged into the pre-assembly areas 25 can be adjusted in the manners described above. Thus, the time delays between the opening of the three pool gates 27 to each pre-assembly area can be reduced, and hence the overall time of article transportation can be reduced while the article batches X are aligned in the direction of transportation C.

After article batches X are placed in a wait condition at the entrances to the two main assembly areas 29, they are sequentially introduced into the main assembly areas 29 by opening the corresponding intermediate gates 31 such that, as done by sequentially opening the pool gates 27, the article batches X introduced into the main assembly areas 29 become aligned and are led to the outlet 32 along the guide rails 21 until they are stopped by the two discharge gates 34. These discharge gates 34 are opened next such that the two article batches X stopped thereby are allowed to further advance on the second discharge conveyor 19B along the guide plates 35 and 36 until they reach the rear gates 38. The two rear gates 38 are opened alternately in response to signals outputted from a packaging machine (not shown) such that the article batches X stopped thereby are introduced into the discharge route 40 in an aligned formation.

Although the structure of a combinational weighing system according to the present invention has been described above with reference to only one example, each of its component devices can be structured in many different ways. For example, although article batches are adapted to be weighed while they are being transported according to the embodiment described above, the weighing may take place while the weighing conveyors 14 are temporarily stopped. In such a situation, a weigher gate 52 may be provided to each weighing conveyor 14 as shown in FIG. 6A such that the weighing will take place while the article batch X to be weighed is stopped by the weigher gate 52. An advantage to be gained by this is that extra articles X can be added when the weight of the originally supplied article batch X is excessively small. As another example, the discharge device 3 may be set below the supply routes 6a, as shown in FIG. 6B, with weighing devices 53 having a sloped weighing plate 53P and a weigher gate 52 thereon. With the weighing devices 53 thus structured, articles X discharged from the supply lines 6a slide down along the slope of the weighing plate 53P, stopped by the weigher gate 52 and weighed in this stopped condition. This structure is advantageous in that the weighing conveyors can be dispensed with and hence the production cost of the system can be reduced.

As another example, a plurality of pooling devices 23 may be provided to each weighing conveyor 14. According to the embodiment shown in FIG. 7A, a switching conveyor 58 is disposed between each of the weighing conveyors 14 and a plurality (two, according to FIG. 7A) of corresponding pooling devices 23 each at the upstream end of a discharge conveyor 19A set in layers one above another. The switching conveyor 58 can swing up and down around its front roller 58a on the upstream side. The control unit 45 includes a connection selecting means 55. When one of the pooling devices 23 is emptied after the article batch X thereon is selected by the combination calculating means 20 and discharged to the discharge device 3, such an emptied pooling device is connected to the weighing conveyor 14 by the operation of the connection selecting means 55 to swing up or down the switching conveyor 58 such that the next article batch X from the weighing conveyor 14 will be stored thereon. This embodiment is advantageous in that the total number of pooling devices 23 storing weighed article batches X is thereby increased and hence that the number of possible combinations is increased accordingly. In other words, the accuracy of combinational weighing can be improved. This embodiment is particularly useful when items like uniformly shaped potato chips are being packaged because the aligned formations of the weighed article batches are not disturbed by switching their travel paths up and down.

FIG. 7B shows another embodiment whereby two pooling devices 23A and 23B corresponding to the same weighing conveyor 14 are arranged on the same plane with a switch gate 56 provided in the middle. The switch gate 56 is controlled, as in the example described above with reference to FIG. 7A, and a newly weighed article batch X is introduced into the pooling device 23A or 23B from which a selected article batch has just been discharged to the discharge device 3. This embodiment shown in FIG. 7B is advantageous when relatively large articles such as large size biscuits or chocolate are being handled.

As a still further variation of the above, a plurality of pooling devices 23 corresponding to each weighing conveyor 14 may be arranged in the same plane and in series in the direction of transportation C. If four pooling devices 23 are thus arranged in series for each of the article transporting means 6a, as shown in FIGS. 8A and 8B, a combination can be made by selecting from weighed article batches on a 4×n matrix where n is an integer which may be less than 18 (or the total number of the weighing conveyors 14). According to the embodiment shown in FIGS. 8A and 8B, each pooling device 23 is formed as a conveyor (hereinafter referred to as the second pool conveyor, to distinguish from the first pool conveyors 13). As shown in FIG. 8A, each of the second pool conveyors 23 can swing up and down to change the destination of its delivery, and there is a collecting conveyor 59 disposed therebelow and elongated in the direction of transportation C. The control unit 45 includes a transportation control means 57 which serves to cause those of the second pool conveyors 23 selected by the combination calculating means 20 to swing downward such that the article batch X placed thereon is caused to slide down onto the collecting conveyor 59. Thereafter, the corresponding weighing conveyor 14 and the second pool conveyors 23 which were not selected are operated to transport a new article batch X sequentially from the upstream side onto each of the second pool conveyor 23 which has just been emptied. This has the effect of further increasing the number of combinations that can be calculated and hence improving the accuracy and speed of combinational weighing.

As a variation of the above, the combination calculating means 20 may be programmed to consider not only the article batches X on the second pool conveyors 23 but also those on the weighing conveyors 14 for combinational calculations. If this is done, combinations are calculated by using 5×n weight values and both the speed and accuracy of combinational weighing can be further improved. When the article batch X on one of the weighing conveyors 14 is selected by the combination calculating means 20, however, it may not be possible to discharge it unless the article batch X on the second pool conveyor 23 immediately downstream to it has also been selected and is going to be discharged. For this reason, the control unit 45 according to this embodiment of the invention also includes a condition changing means 58 for causing such neighboring second pool conveyor 23 to be also selected in the combinational calculations and to discharge the article batch X thereon, as well as the article batch X on the selected weighing conveyor 14, down to the collecting conveyor 59.

Although it has been disclosed above that a combination is selected from the weight signals for article batches X weighed by the individual weighing devices 2 and stored in the pooling devices 23, a high-speed combination calculation (as disclosed in U.S. Pat. Nos. 4,491,189 and 4,585,081) may be carried out to select the next combination by combining the weights of the leftover article batches X not selected (and hence not discharged) in the previous cycle of combinational weighing. When articles of a different kind are supplied into a specified supply lines 6a with the requirement that combinations to be selected must include articles of that kind, use may be made of a program as disclosed in Japanese Patent Publication Tokkai 58-82127. The combination calculating means 20 may be further adapted for a situation where a target weight is set for each of a plurality of different kinds of articles and combination weighing is carried out for each of them as disclosed in U.S. Pat. No. 4,549,617. Consider, for example, target weight values are a, b and c for articles of kinds A, B and C, respectively such that the total target value is a+b+c. In such a situation, an upper limit value and a lower limit value may be specified for each of the kinds of articles but there is no need to consider the upper or low limit value for the total combined weight. When only two kinds of articles A and B are mixed, on the other hand, combinational calculations may be carried out for A with its target value a, while the target value for B may be calculated by subtracting the actually measured weight $W_a$ of the articles of kind A from an overall target value W set for the combination of both A and B, or by setting the target value for B equal to $W-W_a$. The present invention is also applicable where the user must take into account of a target number of articles as well as a target weight. In such an application, the combination calculating means 20 may be programmed to select a combination from those containing the specified number of articles, having the total weight closest to the target weight value.

Next, combinational weighing systems according to a second embodiment of the invention will be described. The second embodiment of the invention is addressed to situations where an article batch X discharged from a particular supply line 6a is not selected over many cycles of combinational weighing. In such a situation, the number of available combinations from which a selection can be made is effectively reduced and the occurrence of unusable combinations becomes frequent. Moreover, the flow of articles X stops in such a supply route, and that will adversely affect the production process on the upstream side of the system. In such a situation, it may be necessary to stop the operation of the entire system to remedy the condition. In view of such possibilities, a method of combinational weighing according to the second embodiment of the invention is characterized by the steps of calculating the cumulative total weight of article batches discharged from each of the weighing devices 2 and prioritizing such supply line such that the article batch therefrom will be automatically selected or will have an increased possibility of being selected in the next combinational calculations.

As schematically shown in FIG. 9, a control unit 45 according to the second embodiment of the invention includes not only a combination calculating means 20 but also a discharged weight calculating means 60 and a limit changing means 61. The discharged weight calculating means 60 is for keeping track of the total weight of articles X discharged from each of the supply lines 6a. These cumulatively calculated total discharged weight values are used by the limit changing means 61 to change the upper and lower limit values of the combinational calculations for determining the allowable range of total weight such that the article batches X from those supply lines 6a with small discharged weight values can be more easily selected. This can be accomplished, for example, by making the upper limit larger. If the cumulatively calculated total discharged weight corresponding to any supply line is smaller than a specified reference value, the combination calculating means 20 according to the second embodiment of the invention will carry out combinational weighing by changing the upper and lower limit values and using such changed limit values in the next cycle of combinational weighing. The operation of such a combinational weighing system according to this embodiment of the invention will be described next with reference to the flow chart of FIG. 10.

When the operation is started, a maximum allowable difference value A and an allowable absolute upper limit value G are set in the control unit 45 (Step S1). The maximum allowable difference value A is the maximum allowable value as the difference L between the maximum and minimum weights of an article batch X, and the allowable absolute upper limit value G is defined as the largest difference value by which the total weight of a combination is allowed to exceed the target value in combinational calculations. If the target weight is 200 g but combinations with total weights up to 210 g are to be allowed, the allowable absolute upper limit value G in such a situation is 10 g.

Next, the discharged weight calculating means 60 of the control unit 45 retrieves the weight signals from the load cells 46 (Step S2) and obtains the cumulative sum of discharged weight value for each of the weighing devices 2 from the beginning of the operation of the system (Step S3). This value is updated only when an article batch weighed by the associated weighing device 2 is selected by combinational calculations and is discharged to the discharge device 3. If an article batch is not selected in the combination, the corresponding weight value is not added to update the stored value.

Next, the maximum $G_1$ and the minimum $G_2$ of the cumulative total weight values obtained in Step S3 are extracted (Step S4), and the next allowable upper limit value $G_x$ for the next cycle of combinational weighing is calculated as follows (Step S5):

$$G_x = K(G_1 - G_2)/A,$$

where K is a proportionality constant in the unit of weight. If the maximum allowable difference value A is 100 g and $(G_1-G_2)=70$ g, and if the proportionality constant is set equal to 5 g, the allowable upper limit value $G_x$ for the next cycle of combinational weighing becomes 3.5 g. If the target weight is 200 g, this means that the allowed range of measured weight is between 200 g and 203.5 g.

Next, the control unit 45 designates the weighing device 2 corresponding to the smallest cumulative total weight value $G_2$ as one to be given priority in the next cycle of combinational weighing (Step S6), and then examines whether the allowable upper limit value $G_x$ is greater than the allowable absolute upper limit value G set in Step S1 (Step S7). If $G_x$ is smaller than G, as in the example considered above, the allowable upper limit value $G_x'$ at the time of the preceding cycle of combinational weighing is compared with the allowable absolute upper limit value G (Step S8). If the preceding allowable upper limit value $G_x'$, too, is found to be smaller than the allowable absolute upper limit value G, the limit changing means 61 sets the current allowable upper limit value $G_x$ (such as 3.5 g in the example discussed above) as the upper limit of error, and the next combinational calculations are carried out (Step S9). Thus, a combination will be selected next such that the designated weighing device 3 will necessarily be included and the total weight will be greater than the target weight value by less than the allowable upper limit value $G_x$ and is the closest to the target value.

The weight value of each of the selected combination is added to the old cumulative sum value, and the updated values thus obtained are stored (Step S10). Thereafter, the article batches X are discharged from the selected weighing devices 3 by opening the associated gates and collected as explained above (Step S11).

To explain Step S1 more in detail, the control unit 45 transmits signals to the pool gate cylinders 26 to open those of the pool gates 27 for the weighing devices 2 which have been selected in the combination such that the articles X which have been thereby prevented from moving further are discharged in the downstream direction and collected by means of the discharge device 3. At about the same time, the control unit 45 transmits signals to the supply gate cylinders 17 associated with those pool gates 27, which have been opened, to thereby open the corresponding supply gates 18 to cause a new group of articles X to pass therethrough, be weighed on the corresponding weighing conveyors 14 and transported to the positions of the corresponding pool gates 27. After all these new article batches X formed therefrom are weighed, the next cycle of combinational calculations is commenced.

In summary, an article batch X is preferentially discharged each time from the weighing device 2 which has the smallest cumulative total discharged weight value and the supply line corresponding to which has the longest waiting line of articles to be weighed. In this way, the longest waiting line in the supply lines becomes quickly shorter. By repeating this process over many cycles, the cumulative total discharged weight values become evenly distributed among the weighing devices 2, and the lengths of the waiting lines become averaged out quickly. Thereafter, the limit changing means 61 replaces the stored value of $G_x'$ by $G_x$ (Step S12) and the next processing is started.

If no combination is found in Step S9, of which the total weight is greater than the target weight value by less than the allowable upper limit value $G_x$, the same upper limit value $G_x$ is maintained for the next cycle of combinational weighing and the designated weighing device 2 is excluded from the combination. In other words, it is considered more important in such a situation to maintain the high level of accuracy in the operation of the system than to quickly average out the lengths of waiting lines of the articles X.

If the difference $(G_1-G_2)$ becomes too large, the value of the allowable upper limit value $G_x$ calculated in Step S5 becomes proportionately larger and the probability for a designated weighing device to be included in a selected combination increases accordingly. In summary, the present invention strikes a balance between the seemingly opposite requirements that the accuracy of combinational weighing be maintained high and that all weighing devices should be selected as evenly as possible.

If the allowable upper limit value $G_x$ is found to be larger than the allowable absolute upper limit value G in Step S7, $G_x$ is set equal to this value of G (such as 10 g in the example given above) (Step S13), disallowing larger deviations.

In situations where the value of G is substituted for the allowable upper limit value $G_x$ and if this allowable upper limit value $G_x$ is the same as in the preceding cycle $(G_x')$, the control unit 45 compares the current value of $G_x$ with the value of G divided by a specified integer N (Step S14) and holds the value of $G_x$ equal to G until $G_x$ becomes smaller than G/N (Step S15). If G=10 g and N=2, for example, the value of $G_x$ is kept equal to 10 g until the calculated value of $G_x$ becomes smaller than 5 g. In other words, when the difference $(G_1-G_2)$ between the largest and smallest cumulative total discharged weights has become significantly large, the allowable upper limit value for combinational calculations is kept equal to G until the calculated allowable upper limit value $G_x$ corresponding to this difference becomes sufficiently small. In the meantime, the difference $(G_1-G_2)$ between the largest and smallest cumulative total discharged weights will become smaller, and the fluctuations among the lengths of waiting lines of the articles X at the pool gates will be diminished quickly.

The formula given above for calculating the value of $G_x$ as being proportional to the difference $(G_1-G_2)$ is to be regarded merely as an example. Instead, the value of $G_x$ may be set proportional to the square of the difference as follows:

$$G_x = K(G_1-G_2)^2/A$$

where K is a dimensionless proportionality constant. If this formula is used instead, the allowable upper limit value increases much faster as the difference between $G_1$ and $G_2$ increases. In other words, this formula is used when it is more important to eliminate the fluctuations among the lengths of waiting lines than to maintain the level of accuracy in the weighing.

As an alternative to the scheme described above, the lengths of time during which no discharge was made from each weighing device may be considered such that priority for discharge will be given to a weighing device which has not discharged for the longest period of time. For implementing such a scheme, the control unit 45 may be provided with a counter 63 for measuring the no-discharge time for each weighing device, a count judging means 64 and a count setting means 65, as shown in FIG. 11. The counter 63 is adapted to monitor the pool gates 27 of the discharge device 3 and keeps track of the cumulative length of time (count) during which no discharge of articles was made through each of the gates 27. These count values are compared by the count judging means 64 with a reference value inputted through the count setting means 65. The combination calculating means 20 will carry out combinational calculations such that the weighing device, for which the count value exceeds the reference value, will be included in the next combination to be selected.

FIG. 12 shows still another combinational weighing system according to a third embodiment of the invention adapted to prioritize a weighing device for the discharge of its article batch. This system is characterized as having a camera means such as an image sensor 62 adjacent to each of the supply lines 6a on the upstream side of the weighing conveyor belts 14. Its control unit 45 is further characterized as containing an image processing means 67, a size judging means 68 and a reference value setting means 69. The image sensors 62 serve to take the pictures of the supply lines 6a to ascertain the amount of articles stored in each of them at each time. The images taken in by the image sensors 62 are processed by the image processing means 67 in terms of the area on a screen. The size judging means 68 serves to compare the image size with a reference area size set by the reference value setting means 69. If the image size of articles X in any of the supply lines 6a is found to be greater than the reference value, the combination calculating means 20 prioritizes the weighing device associated with such a supply line in the next cycle of combinational calculations such that the associated weighing device has a higher probability of being selected.

The combinational weighing system according to the first embodiment of the invention was described above with reference to FIGS. 1 and 2 as aligning discharged article batches by opening the corresponding gates at different times. This method of aligning article batches discharged through different gates is not intended to limit the scope of the invention. FIGS. 13–18 show still another combinational weighing system according to a fourth embodiment of the invention characterized as using an obliquely arranged conveyor for aligning discharged article batches. For the purpose of illustration, there is shown a system with only nine supply lines 6a.

With reference simultaneously to FIGS. 13, 14 and 15, the discharge device 3 according to this embodiment includes a main conveyor 71 which comprises a wide planar belt 72 adapted to be driven in the direction of transportation C by means of a motor (not shown) and is disposed on the downstream side of nine weighing conveyors 14 arranged transversely next to one another. There is a frame 74 which is supported above the main conveyor 71 by support columns 73. Partitioning members 75 are suspended from this frame 74, serving to partition the top surface of the belt 72 into nine article transporting passages 76-1 through 76-9, connecting correspondingly to the downstream ends of the nine weighing conveyors 14. These nine article transporting passages 76 are not of the same length, the first passage 76-1 at one edge being the shortest, the ninth passage 76-9 at the opposite edge being the longest, and the lengths of the passages increasing monotonically from the first to the ninth passage as clearly shown in FIG. 13.

The passages 76 are further provided with many gates 77 at a uniform pitch, each for preventing article batches on the main conveyor from passing therethrough when closed. The first passage 76-1 has only one gate thereon. The second passage 76-2 has two gates thereon. The number of gates increases by one as one goes from the first to the ninth gate, the ninth passage 76-9 having nine gates thereon. The first gates on all of these passages 76 are transversely aligned across the passages 76, the second gates on the second through ninth passages are also transversely aligned, and so on. Those of the gates 77 mutually transversely arranged are suspended from a common support shaft 78 as shown in FIG. 14. In other words, as shown in FIG. 13, there are nine such support shafts 78 disposed at a constant pitch in the direction of transportation C, the one at the upstream end supporting the nine first gates 77 for the first through ninth passages, the next one supporting the eight second gates 77 for the second through ninth passages, and the one at the downstream end supporting only the ninth gate for the ninth passage 76-9. A motor 79 is supported on the frame 74 for rotating the nine support shafts 78 by a fixed angle through a first crank mechanism 80, a connecting shaft 81 and a second crank mechanism 82 of known kinds, thereby opening all gates 77 of all passages 76 at the same time as indicated by arrows B in FIG. 15.

In addition to the above, the discharge device 3 is further provided with a collecting conveyor 83, supported by a frame 84 spanning over the main conveyor 71, diagonally crossing above the main conveyor 71 in an oblique direction indicated by an arrow E, and connecting the downstream ends of the nine passages 76. The collecting conveyor 83 is provided with many pairs of guide plates 86 attached to a pair of chains 87 stretched along the direction of motion E of the collecting conveyor 83. The guide plates 86 of each pair form therebetween a collection route 85 which can connect to the downstream end of any of the article transporting passages 76.

As the chains 87 are pulled in the direction of E by a chain-pulling motor 88 attached to the frame 84, each guide plate 86 moves also in the direction of E, while remaining parallel to the direction C of the passages 76. The collecting conveyor 83 is adapted to move intermittently by one pitch such that, if the upstream end of a pair of guide plates 86 is adjacent to the downstream end of one of the passages 76-j, the collecting conveyor 83 will stop next such that the same pair of guide plates 86 will be adjacent to the downstream end of the next passageway 76-(j+1). As the guide plates 86 continue to move in the oblique direction E, each collection route 85 eventually reach a discharge position D next to the ninth passage 76-9 and connected to a discharge route 50 formed with fixed guide plates 89. Thereafter, the guide plates 86 on the collecting conveyor 83 flip over as the motor 88 continues to operate, returning from the side of the ninth passage 76-9 back to the opposite side of the first passage 76-1. A fixed wall 91 is provided on the downstream side of the collecting conveyor 83, thereby closing the downstream end of the collection routes 85 formed on the collecting conveyor 83. Although not expressly shown, the operation of the main conveyor 71, opening and closing of the gates 77 and the associated motion of the collecting conveyor 83 are controlled by a control unit (not shown).

The operation of the discharge device 3 shown in FIGS. 13–15 will be explained next with reference to FIGS. 16–18. For the purpose of explanation, let us consider an exemplary situation where the article batches X on the first, second, fourth and eighth weighing conveyors have been selected as the combination to be discharged by combinational calculations and these article batches X have just been discharged to the discharge device 3 and introduced, by the movement of the main conveyor 71, correspondingly into the first, second, fourth and eighth article transporting passages 76-1, 76-2, 76-4 and 76-8, as shown by solid lines in FIG. 16. Since the gates 77 are normally all closed, these introduced article batches X advance to the positions of the first gates on their respective passages. As all gates 77 are opened at once, all four of these articles X pass through the respective first gates 77. Since there is no more gate in the first passage 76-1, the article batch X in the first passage 76-1 will continue to move forward (that is, in the downstream direction), enter the corresponding one (85a) of the collection routes 85 on the collecting conveyor 83 and be moved still further forward along the guide plates 86 until it is stopped by the fixed wall 91 (as shown by dotted lines in FIG. 16 and by solid lines in FIG. 17). The article batches X in the second, fourth and eighth passages 76-2, 76-4 and 76-8, on the other hand, can advance only to the second gates 77 and stopped thereby as shown also by dotted lines in FIG. 16.

Next, the collecting conveyor 83 moves by one pitch such that the collection route 85a containing the article batch X received from the first passage 76-1 comes to the downstream side of the second passage 76-2. During this process, the article batch X therein keeps traveling in the downstream direction by the movement of the main conveyor 71, while being guided by the solid wall 91. It thus reaches the downstream end position of the second passage 76-2 as shown by solid lines in FIG. 17.

As the gates 77 are opened and closed next, the article batch X in the second passage 76-2 is allowed to pass through its second gate 77 and is introduced into the collection route 85a which is then on the downstream side of this passage, but since the article batch X collected from the first passage 76-1 is already at the downstream end of this collection route 85a adjacent to the fixed wall 91, the article batch X from the second passage 76-2 comes behind the one from the first passage 76-1 to form an aligned group, as shown by solid lines in FIG. 18. In the meantime, the articles batches X in the fourth and eighth passages 76-4 and 76-8 are advanced to and stopped by the third gates for their passages, as shown also by solid lines in FIG. 18.

Two cycles thereafter of opening and closing of the gates 77, the article batch X in the fourth passage 76-4 similarly travels in the downstream direction and is aligned behind, and with, the aligned combination of the article batches X from the first and second passages 76-1 and 76-2 which combination is then at the downstream end of the fourth passage 76-4. Still four cycles thereafter, the article batch X in the eighth passage 76-8 similarly becomes aligned behind, and with, the already aligned combination of the three article batches X from the first, second and fourth passages 76-1, 76-2 and 76-4. This process is schematically shown by dotted lines in FIG. 18. Thus, the four article batches X discharged simultaneously from the weighing devices 2 into the discharge device 3 are sequentially introduced into the same collection route 85a to make up an aligned combination. After this aligned combination reaches a discharge position D by the movement of the collecting conveyor 83, it is transported out of the discharge device 3.

FIGS. 19A and 19B show still another combinational weighing system according to a fifth embodiment of the invention having a different discharge device 3 characterized as having mutually parallel discharge conveyors 92-1 through 92-18 which correspond individually to the plurality of weighing conveyors 14 so as to receive discharged article batches therefrom and are adapted to transport them at different rates towards a pusher conveyor 94 and a slide plate 96 which are disposed along the downstream edges of and perpendicularly (in the direction shown by arrow F) to the discharge conveyors 92 such that article batches simultaneously discharged from the weighing conveyors 14 reach and land on the slide plate 96 at different times. With reference to FIG. 19A, let the speed of the jth discharge conveyor 92-j be denoted by $V_j$ (where j is a dummy index $1 \leq j \leq 18$) and $V_1 > V_2 > \ldots > V_{18}$. Thus, of the article batches simultaneously discharged from the weighing conveyors 14, the one on the discharge conveyor 92 closest to the first discharge conveyor 92-1 reaches the slide plate 96 most quickly. The pusher conveyor 94 is disposed above and parallel to the slide plate 96, as shown in FIG. 19B, and is for the purpose of pushing article batches reaching the slide plate 96 in the direction of arrow F. The pusher conveyor 94 comprises a pair of pulleys 94A and 94B and an endless belt 94C which is stretched therebetween and provided with scraper plates 95 at even intervals for pushing article batches by moving with the belt 94C.

Next, the operation of this discharge device will be described. As was the case with most of the embodiments of the invention described above, article batches of a selected combination are introduced into the discharge 3 at the same time. For the purpose of illustration, FIG. 19A shows a situation where article batches $X_1$, $X_2$ and $X_{18}$ were among the article batches discharged simultaneously from the corresponding weighing conveyors 14. As explained above, the first article batch $X_1$ is the fastest to move with the speed of $V_1$ and is the first to reach the slide plate 96, while the article batch $X_{18}$ on the eighteenth conveyor 92-18, being the slowest to move with the speed of $V_{18}$, is the farthest back from the slide plate 96 at the same time, as shown in FIG. 19A.

In the example being considered, the next article batch to reach the slide plate 96 is the second article batch $X_2$ on the second discharge conveyor 92-2. Before this happens, however, the pusher conveyor 94 is activated such that one of its scraper plates 95 pushes the first article batch $X_1$ in the direction F until it reaches the position where it crosses the second discharge conveyor 92-2. In other words, by the time the slower moving second article batch $X_2$ reaches the slide plate 96, the first article batch $X_1$ is already there. As a result, the second article batch $X_2$ hits the first article batch $X_1$ from behind, becomes aligned with it, and pushes it farther onto the slide plate 96 while remaining aligned with it. This aligned combination of the two article batches $X_1$ and $X_2$ is similarly pushed by one of the scraper plates 95 to the position where the next article batch will reach the slide plate 96.

As this process is repeated for all article batches X reaching the slide plate 96, these article batches are finally pushed off the slide plate 96 onto a delivery conveyor 98 through an exit 97 at the downstream end of the slide plate 96 in the direction F. The delivery conveyor 98 is for transporting article batches to a packaging machine (not shown), but the article batches are already aligned as they are discharged onto the delivery conveyor 98.

As a variation to the fifth embodiment of the invention described above, the plurality of discharge conveyors 92 may be run at the same speed such that $V_1 = V_2 = \ldots = V_{18}$ if those of the pool gates 27 (not shown in FIG. 19A) adapted to be opened to introduce selected article batches are actually opened at different times such that these selected article batches will reach the slide plate 96 at different times although they travel at the same speed once they are on the discharge conveyors 92.

Although the invention has thus been described above with reference to only a limited number of embodiments and variations, many modifications and variations are possible within the scope of the invention. For example, although the invention has been described above as being related to "combinational weighing", the invention can be easily applied to "combinational counting" wherein numbers, instead of weights, of articles in batches are measured and combined and "selection" of a combination is made in view of the total number, instead of the total weight, of the articles in the combination. Examples of such applications are not specifically described or separately illustrated, but such applications will be apparent to a person skilled in the art. Thus, expressions like "measuring" and "measured quantity" in the claims below are intended to include not only "weighing" and "measured weight" but also "counting" and "counted number". Any such modifications and variations that may be apparent to a person skilled in the art are intended to be within the scope of the invention.

What is claimed is:

1. A combinational weighing system comprising:

a supply device having a plurality of supply lines for sequentially transporting articles;

a plurality of measuring devices individually associated with said plurality of supply lines for sequentially measuring quantities of batches of said articles received from associated ones of said supply lines;

a discharge device having a plurality of separate paths individually corresponding to said plurality of measuring devices for transporting article batches measured by said measuring devices through said plurality of paths to an outlet in a general direction of flow;

a combination calculating means for calculating combinations of measured values obtained by said measuring devices and selecting a combination of said article batches according to a predefined criterion; and aligning means for causing article batches in said selected combination to be transported by said discharge device along different ones of said separate paths corresponding to the measuring devices in said selected combination, wherein said selected article batches become assembled and automatically aligned one behind another in said direction of flow at said outlet.

2. The combinational weighing system of claim 1 wherein each of said measuring devices comprises a weighing conveyor capable of simultaneously transporting and weighing said article batches.

3. The combinational weighing system of claim 1 wherein said discharge device includes pooling devices for temporarily storing article batches measured by said measuring devices, said system further comprising a discharge control means for causing those of said article batches, which are stored on said pooling devices and are selected by said combination calculating means according to said criterion, to be discharged to said discharge device.

4. The combinational weighing system of claim 3 wherein said discharge device includes:

a plurality of pooling devices corresponding to each of said measuring devices; and a switching means for selectively connecting one of said plurality of pooling devices to said each measuring device.

5. The combinational weighing system of claim 3 wherein each of said pooling devices includes a plurality of pooling conveyors arranged linearly, and said system further comprises:

a collecting conveyor disposed below said pooling conveyors; and a transportation control means for displacing those of said pooling conveyors selected by said combination calculating means to thereby cause article batches on said selected pooling conveyors to be transferred onto said collecting conveyor and thereafter causing new article batches to be transported onto said selected pooling conveyors.

6. The combinational weighing system of claim 3 wherein each of said pooling devices includes a plurality of pooling conveyors arranged linearly, said combination calculating means serving to combine measured quantity values, obtained by said measuring devices, of article batches on said pooling conveyors; said system further comprising:

a collection conveyor disposed below said pooling conveyors; and a transportation control means for changing positions of those of said pooling conveyors selected by said combination calculating means, thereby causing articles on said selected pooling conveyors to be transferred onto said collection conveyor and thereafter causing different article batches to be transported onto said selected pooling conveyors.

7. The combinational weighing system of claim 3 wherein each of said pooling devices includes a plurality of pooling conveyors arranged linearly, said plurality of pooling conveyors including a first pooling conveyor which is adjacent to and is adapted to receive article batches directly from the corresponding one of said measuring devices, said combination calculating means serving to combine measured quantity values, obtained by said measuring devices, of both article batches on said first pooling conveyor and said corresponding measuring device and article batches on the others of said pooling conveyors of each of said pooling devices; said system further comprising:

a collection conveyor disposed below said pooling conveyors; and a transportation control means for changing positions of those of said pooling conveyors selected by said combination calculating means to thereby causing articles on said selected pooling conveyors to be transferred onto said collection conveyor and thereafter causing different article batches to be transported onto said selected pooling conveyors.

8. The combinational weighing system of claim 2 wherein said weighing conveyors are provided with supply gates adapted to be opened and closed to control the amounts of articles to be delivered from said supply lines individually onto said weighing conveyors.

9. The combinational weighing system of claim 2 further comprising auxiliary conveyors between said supply device and said weighing conveyors, said auxiliary conveyors being adapted to receive articles from said supply device and to transport said received articles faster away from said supply device than said supply device transports said articles towards said auxiliary conveyors.

10. The combinational weighing system of claim 1 further comprising discharged quantity calculating means for calculating cumulatively the total quantity of articles discharged from each of said measuring devices, said combination calculating means prioritizing one of said measuring devices that is found by said discharged quantity calculating means to have discharged less articles than the others of said measuring devices and thereby making said prioritized measuring device more likely than the others of said measuring devices to be selected when calculating combinations next.

11. The combinational weighing system of claim 1 further comprising:
   image sensor means disposed adjacent each of said supply lines for sensing images of articles in said supplying lines; and
   size judging means for detecting, from image data received from said image sensor means, the amounts of articles which have passed through said supply lines and judging whether said detected amounts are less than a specified reference value;
   said combination calculating means prioritizing the measuring device corresponding to any of said supply lines found by said judging means to have passed less articles than said reference value and thereby making said prioritized measuring device more likely than the others of said measuring devices to be selected when calculating combinations next.

12. The combinational weighing system of claim 1 wherein said discharge device comprises:
   a main conveyor which is constantly moving in said direction of flow, a plurality of mutually parallel passages being defined on said main conveyor, said passages extending in said direction of flow and arranged next to one another in a transverse direction with respect to said direction of flow;
   a plurality of gates disposed at a constant pitch along said passages for controllably allowing or not allowing article batches to pass therethrough, the numbers of said gates along said passages increasing by one from one to the next of said passages in said transverse direction;
   an oblique conveyor disposed above said main conveyor and extending in an oblique direction with respect to said passages for transporting article batches thereon in said oblique direction; and
   control means for opening all of said gates simultaneously and periodically at set time intervals, thereby allowing articles on said passages to advance intermittently from one to the next of said gates or onto said oblique conveyor, and moving article batches on said oblique conveyor from one to the next of said passages in one of said time intervals.

13. The combinational weighing system of claim 1 wherein said discharge device comprises:
   a plurality of discharge conveyors extending in said direction of flow and arranged next to each other in a perpendicular direction to said direction of flow, said discharge conveyors moving at different speeds, said different speeds decreasing monotonically from one to the next of said discharge conveyors in said perpendicular direction; and
   pushing means for pushing article batches in said perpendicular direction such that a later arriving one of said article batches on a slower one of said discharge conveyors is aligned in said direction of flow behind an earlier arriving one of said article batches on a faster one of said discharge conveyors.

14. The combinational weighing system of claim 1 further comprising:
   pool gates individually associated with said measuring devices for selectably allowing or not allowing article batches to pass therethrough to enter said discharge device;
   gate control means for opening said gates at different times; and
   pushing means for pushing article batches transversely to said direction of flow inside said discharge device such that a later arriving one of said selected article batches entering said discharge device later is aligned in said direction of flow behind an earlier arriving one of said selected article batches entering said discharge device earlier.

15. A combinational weighing method comprising the steps of:
   supplying articles sequentially along each of a plurality of supply lines connected to associated one of measuring means;
   measuring quantities of batches of said articles supplied through said supply lines to said measuring means to thereby obtain measured quantities;
   calculating combinations of said measured quantities to select a particular combination of said article batches according to a predefined criterion and discharging those of said article batches in said selected combination into corresponding ones of a plurality of mutually separate paths which are individually associated with said measuring means; and
   causing said discharged article batches to travel through said corresponding paths in a general direction of flow to an outlet according to mutually different travel modes and to thereby become automatically aligned one behind another in said direction of flow when said discharged article batches are assembled together at said outlet.

16. The method of claim 15 further comprising the step of temporarily storing said article batches after being measured, the measured quantities of said temporarily stored article batches being combined in said step of calculating combinations.

17. In a combinational measuring system comprising a plurality of mutually parallel measuring conveyors disposed in a side-by-side relationship with one another and adapted to calculate combinations of quantity values of articles measured by said measuring conveyors, to select a particular combination of said measured quantity values according to a predefined criterion, and to separately collect only those articles corresponding to said selected particular combination; the improvement wherein said combinational measuring system further comprises:

a discharge conveyor for receiving measured articles from said measuring conveyors and transporting said received articles in a direction of flow away from said measuring conveyors;

pool gates for controllably causing articles on said discharge conveyor to be prevented from passing therethrough and be temporarily stopped thereagainst;

combination calculating means for calculating combinations of measured quantity values of articles remaining stopped against said pool gates obtained by said measuring conveyors and selecting said particular combination from said calculated combinations;

gate control means for opening those of said pool gates that are stopping articles of said particular combination from passing therethrough.

18. In a combinational weighing method comprising the steps of supplying article batches to a plurality of measuring devices to thereby measure quantities of said article batches, combining measured quantity values of said article batches obtained by said measuring devices to select a particular combination of said article batches according to a predefined criterion, and collecting only those of said article batches corresponding to said particular combination; the improvement wherein said method further comprises the steps of:

moving said article batches on a discharge conveyor away from said measuring devices after said measured quantity values have been obtained;

temporarily stopping said article batches on said discharge conveyor individually against a plurality of pooling gates; and opening only those of said pool gates stopping article batches of said selected combination;

said particular combination being selected from combinations of article batches individually stopped against said pooling gates on said discharge conveyor.

19. In a combinational weighing system adapted to cyclically receive and measure article batches in a plurality of measuring devices, to calculate combinations of measured values obtained from said article batches by said measuring devices, to select a particular combination from said calculated combinations according to a predefined criterion, and to discharge article batches corresponding to said selected; the improvement wherein said combinational weighing system further comprises:

a plurality of mutually separate paths individually corresponding to said plurality of measuring devices;

discharging means for discharging said article batches in said selected combination into corresponding ones of said plurality of paths leading to an output;

aligning means for causing said discharged means to be transported through said corresponding paths along different ones of said separate paths corresponding to the measuring devices in said selected combination and to thereby become assembled and automatically aligned one behind another when gathering together at said outlet;

a total calculating means for calculating the cumulative total quantity of article batches discharged from each of said weighing devices; and means for modifying said criterion such that the one of said weighing devices that has discharged least according to said total calculating means has improved probability of being selected.

20. In a combinational weighing system adapted to cyclically receive and measure article batches in a plurality of measuring devices, to calculate combinations of measured values obtained from said article batches by said measuring devices, to select a particular combination from said calculated combinations according to a criterion including a target value and an upper limit value, combinations with total measured value greater than said target value by more than said upper limit value being prevented from becoming selected, and to discharge article batches corresponding to said selected combination; the improvement wherein said combinational weighing system further comprises:

a plurality of mutually separate paths individually corresponding to said plurality of measuring devices;

discharging means for discharging said article batches in said selected combination into corresponding ones of said plurality of paths leading to an output;

aligning means for causing said discharged means to be transported through said corresponding paths along different ones of said separate paths corresponding to the measuring devices in said selected combination and to thereby become assembled and automatically aligned one behind another when gathering together at said outlet;

a total calculating means for calculating cumulative total quantity of article batches discharged from each of said weighing devices;

a limit changing means for increasing said upper limit value as the difference becomes larger between the largest cumulative total and the smallest cumulative total calculated by said total calculating means; and means for modifying said criterion, wherein said combinations are calculated by including the one of said weighing devices with the smallest cumulative total discharged quantity and, if there is one or more combinations with the total quantity value allowed by said upper limit value increased by said limit changing means, said particular combination is chosen from said one or more combinations.

21. The combinational weighing system of claim 20 wherein said limit changing means increases said upper limit value according to the square of said difference between the largest cumulative total and the smallest cumulative total calculated by said total calculating means.

* * * * *